United States Patent [19]

Moore et al.

[11] Patent Number: 5,630,127
[45] Date of Patent: *May 13, 1997

[54] PROGRAM STORAGE DEVICE AND COMPUTER PROGRAM PRODUCT FOR MANAGING AN EVENT DRIVEN MANAGEMENT INFORMATION SYSTEM WITH RULE-BASED APPLICATION STRUCTURE STORED IN A RELATIONAL DATABASE

[75] Inventors: Allan R. Moore, Herndon; Lori J. Poulos, McLean; Lynn G. DeFazio, Manassas, all of Va.

[73] Assignee: International Business Machines Corporation, Armonk, N.Y.

[*] Notice: The term of this patent shall not extend beyond the expiration date of Pat. No. 5,446,885.

[21] Appl. No.: 485,897

[22] Filed: Jun. 7, 1995

Related U.S. Application Data

[62] Division of Ser. No. 883,460, May 15, 1992, Pat. No. 5,446,885.

[51] Int. Cl.$^6$ .................................................. G06F 17/30
[52] U.S. Cl. ........................... 395/615; 395/10; 395/54; 395/201; 395/210
[58] Field of Search ............... 395/600, 10, 54; 364/401, 408

[56] References Cited

U.S. PATENT DOCUMENTS

| | | | |
|---|---|---|---|
| 4,658,370 | 4/1987 | Erman et al. | 364/513 |
| 4,866,634 | 9/1989 | Reboh et al. | 364/513 |
| 4,916,633 | 4/1990 | Tychonievich et al. | 364/513 |
| 4,930,071 | 5/1990 | Tou et al. | 364/300 |
| 5,136,523 | 8/1992 | Landers | 395/54 |
| 5,212,650 | 5/1993 | Hooper et al. | 364/489 |
| 5,267,175 | 11/1993 | Hooper et al. | 364/489 |
| 5,315,710 | 5/1994 | Kishimoto et al. | 395/700 |
| 5,325,505 | 6/1994 | Hoffecker et al. | 395/425 |
| 5,361,353 | 11/1994 | Carr et al. | 395/700 |

OTHER PUBLICATIONS

Pavan et al., "The New Wave In Trading Technology," *Wall Street Computer Review*, vol. 5, No. 4, Jan., 1988, pp. 29–40.

Ivy Schmerken, "Hedging Block Desks To Keep Them In The Chips: A Prototype Expert System May Help Paine-Webber Manage The Risky Business Of Hedging Block Trades," *Wall Street Computer Review*, vol. 5, No. 9, Jun., 1988, pp. 19–21.

Sahgal Pavan, "Automation At the 'Big Four'Securities Firm," *Wall Street Computer Review*, vol. 6, No. 4, Jan. 6, 1989, pp. 22–28.

Ivy Schmerken, "What's Next On Wall Street's Automation Agenda?," *Wall Street Computer Review*, vol. 6, No. 7, Apr., 1989, pp. 44–49.

Ted Francis, "Expert System Tools Are Wall Street's Newest Creation," *Wall Street Computer Review*, vol. 6, No. 9, Jun., 1989, pp. 26–33.

Janet Matthew, "OTC Success Spurs Specialized Trading System," *Wall Street Computer Review*, vol. 6, No. 12, Sep. 1989, pp. 26–32.

Ivy Schmerken, "Wall Street Struggles To Balance Global Risk," *Wall Street Computer Review*, vol. 7, No. 11, Aug. 1990, pp. 12–20.

(List continued on next page.)

*Primary Examiner*—Thomas G. Black
*Assistant Examiner*—Paul R. Lintz
*Attorney, Agent, or Firm*—Sterne, Kessler, Goldstein & Fox P.L.L.C.; Edward H. Duffield

[57] ABSTRACT

A rule-based application structure utilizes rules which are stored separately from application programs. The rules are stored in a relational database as objects. A user can modify existing rules and create new rules which are then restored in the database. Because rules are stored as objects in the database, they are easy to locate and retrieve. Because the rules are separate from the application programs, modifications to the rules are easier to accomplish.

16 Claims, 13 Drawing Sheets

OPTION_EXPOSURE = CURR_CONV_RATE * OPTION_VALUE

| OBJECT | OBJECT1 | OPERATOR | OBJECT2 | PROGRAM |
|---|---|---|---|---|
| OPTION_EXPOSURE | CURRENCY_CONV_RATE | X | OPTION_VALUE | NULL |
| CURRENCY_CONV_RATE | CURRENCY_SPOT_RATE | - | CURRENCY_EXCH_RATE | NULL |
| CURRENCY_SPOT_RATE | NULL | NULL | NULL | IMDCSE01 |
| CURRENCY_EXCH_RATE | NULL | NULL | NULL | IMDCEF10 |
| OPTION_VALUE | NULL | NULL | NULL | BLACK_SCHOLES |
| OPTION_DURATION | NULL | NULL | NULL | IMDCEF22 |
| OPTION_STRIKE_PRICE | NULL | NULL | NULL | IMDCMI27 |

OTHER PUBLICATIONS

Victor Kulkosky, "Wall Street Builds on Relational Foundation: Relational Database Management Systems Are Helping Wall Street Turn Dribs And Drabs of Data Into Money Making Information," *Wall Street Computer Review*, vol. 8, No. 3, Dec. 1990, pp. 33–36.

Clive Davidson, "Fast Money," *Computer Weekly*, Oct. 17, 1991, pp. 28–29.

Jenna Michaels, "How to Trade Stocks Day And Night," *Wall Street Computer Review*, vol. 9, No. 2, Nov., 1991, pp. 54–59.

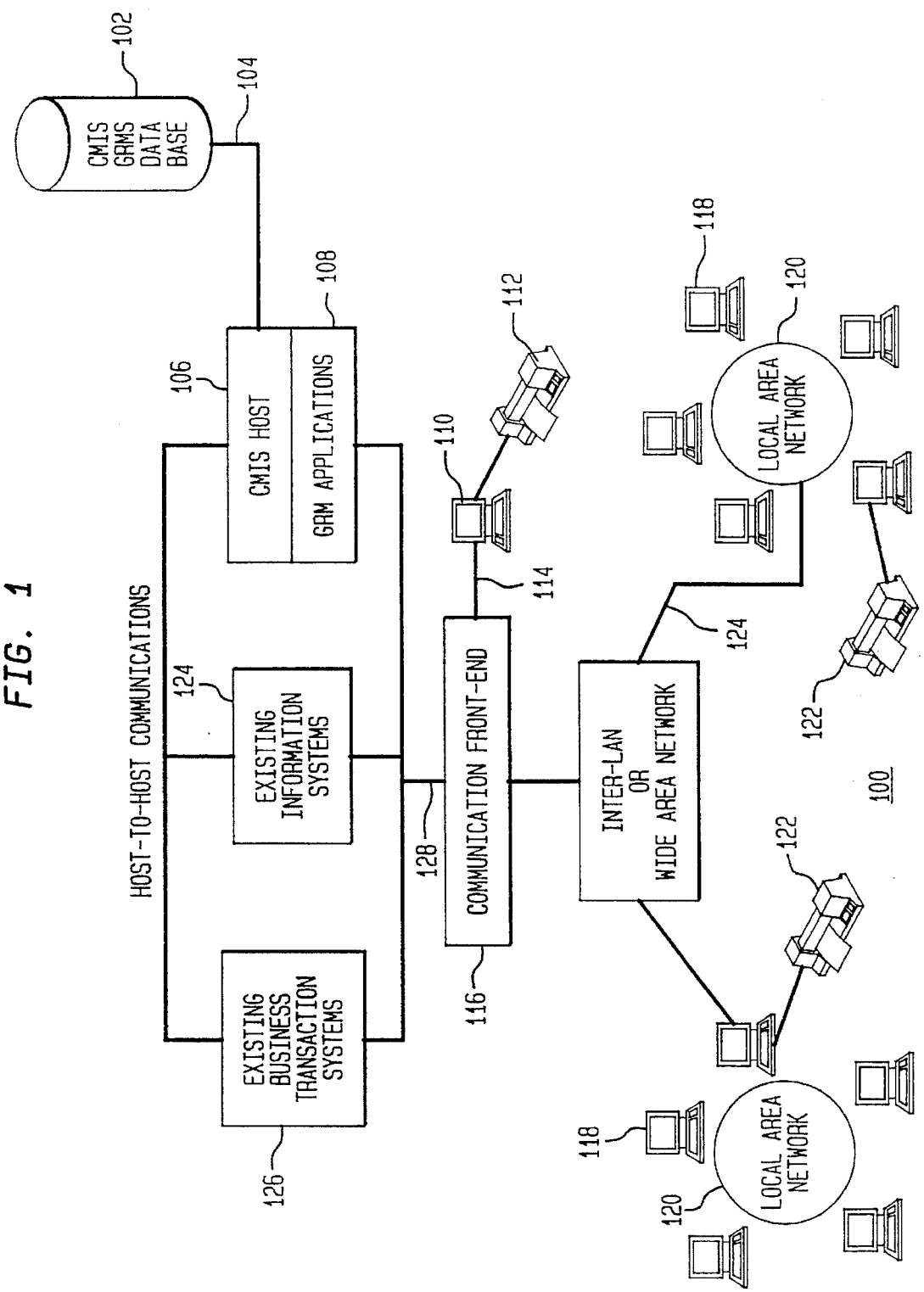

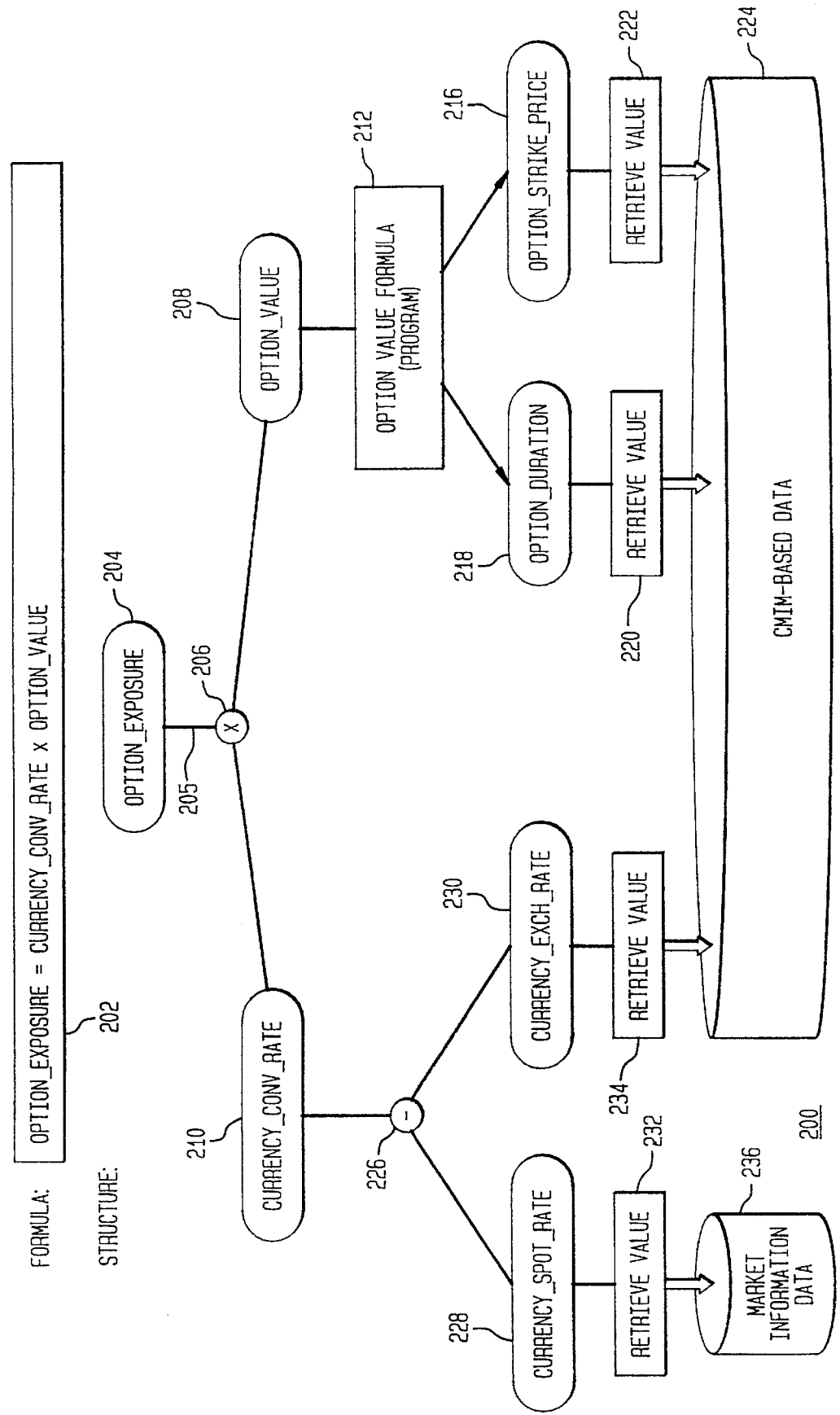

FIG. 3

350 — OPTION_EXPOSURE = CURR_CONV_RATE * OPTION_VALUE

| OBJECT | OBJECT1 | OPERATOR | OBJECT2 | PROGRAM |
|---|---|---|---|---|
| OPTION_EXPOSURE | CURRENCY_CONV_RATE | X | OPTION_VALUE | NULL |
| CURRENCY_CONV_RATE | CURRENCY_SPOT_RATE | – | CURRENCY_EXCH_RATE | NULL |
| CURRENCY_SPOT_RATE | NULL | NULL | NULL | IMDCSE01 |
| CURRENCY_EXCH_RATE | NULL | NULL | NULL | IMDCEF10 |
| OPTION_VALUE | NULL | NULL | NULL | BLACK_SCHOLES |
| OPTION_DURATION | NULL | NULL | NULL | IMDCEF22 |
| OPTION_STRIKE_PRICE | NULL | NULL | NULL | IMDCMI27 |

300

PROGRAM STORAGE DEVICE AND COMPUTER PROGRAM PRODUCT FOR MANAGING AN EVENT DRIVEN MANAGEMENT INFORMATION SYSTEM WITH RULE-BASED APPLICATION STRUCTURE STORED IN A RELATIONAL DATABASE

This application is a division of application Ser. No. 07/883,460, filed May 15, 1992, now U.S. Pat. No. 5,446,885.

DESCRIPTION

1. Technical Field

The present invention relates in general to rule-based management information systems and in particular to financial and banking management information systems for determining financial risk and exposure.

2. Related Art

There is a need for financial institutions to understand the effects of the ever changing domestic and global economic forces in order to maximize return on investments and assets. This means that the institutions must do an excellent job of managing risks across all of their lines of business and products. Financial institutions of all sizes use risk and exposure management information to make decisions about business transactions which affect their capital base and income.

Many of the formulas or rules which institutions use to calculate risk and exposure are among the most closely guarded secrets of those institutions. Also, the rules used for risk and exposure calculations are frequently modified and new rules are frequently created.

Typical management information (computer) systems which are utilized by institutions to perform risk and exposure calculations and analysis are complex software/hardware systems.

Though the actual rules (formulas) used to calculate risk are often mathematically (or logically) quite simple, they are ordinarily buried so deeply in the software that only a programming expert can locate a rule in the system, let alone modify a rule within the system. Further, because a typical management information system (MIS) is quite complex with many interdependencies among its software and hardware parts, any modifications are ordinarily left to software experts because an error in creating or changing a rule can affect an entire system. Because the rules are present in the software, only a software expert can confidently deal with them and, thus, minimize the possibility of an error being made.

There is a need for a system to perform risk and exposure calculations based upon rules which can be created and modified by business professionals (without software or extensive computer expertise) within a financial institution. In that way, a financial institution will consider itself more secure because an outsider (who may want to misappropriate the secret rules) will not be exposed to is highly confidential risk rules.

There is a further need that the risk and exposure rules within such a system be created and stored in a way such that a business professional, and not a software expert, can create and modify the rules.

DISCLOSURE OF INVENTION

SUMMARY OF THE INVENTION

The present invention, which overcomes the foregoing deficiencies, is a rule-based computer application structure which utilizes rules which are stored separately from the application program. Having the rules stored separately from the application program permits the user, a nontechnical person, to easily modify existing rules and create new rules.

Though the invention can be applied to many types of rule-based (or even expert) systems for any type of industry or vertical market, a preferred embodiment encompasses a Risk Analysis System for a financial institution. The Risk Analysis System embodiment of the present invention performs risks and exposure calculations (both mathematical and logical) for the institution based upon the institution's risk and exposure rules, current market information, and other data stored in a Management Information Database (database). Preferably, the system is based upon International Business Machines' CMIM information architecture.

The rules are stored in a database as objects. When the system is to perform a risk calculation based upon a specific rule, the application program retrieves that rule from the database. The rule is stored in the database in the form of a table. The application program then performs a calculation based upon the retrieved rule. The primitive values used to process the rule are stored and can be modified by a user to run "what-if" scenarios. The table structure permits nested mathematical formulas using objects (including rules) as variables. More complex mathematical formulas can be stored as programs but accessed in the same manner as an object.

Another aspect of the system allows a user to modify existing rules and create new rules. The rule is presented to the user in an easily understandable table format. Using menu driven selections, the user can modify an existing rule or create a new rule. The system then converts that rule into the storage form so the rule can be stored, or restored, in the database for use by the application program.

Because the rules are stored as objects in the database, they are easy to locate and retrieve. Access to all objects is through a standard interface. The system utilizes common access programs for primitive objects. This is unlike a typical rule-based system where the rules are deeply buried in the application program and can only be located and recognized by a skilled programmer. Further, because the rules are separate from the application program, modifications to the rules are easier to accomplish. The rules can be complemented and modified by a user that has little or no programming or software expertise.

The foregoing and other objects, features and advantages of the invention will be apparent from the following more particular description of a preferred embodiment of the invention, as illustrated in the accompanying drawings.

BRIEF DESCRIPTION OF DRAWINGS

FIG. 1 is a block diagram of a computer system employing a preferred environment of the present invention.

FIG. 2 is a block diagram of the rule and object/program structure of a preferred embodiment of the present invention.

FIG. 3 is an object table.

DETAILED DESCRIPTION OF THE PREFERRED EMBODIMENT

Figure 4:
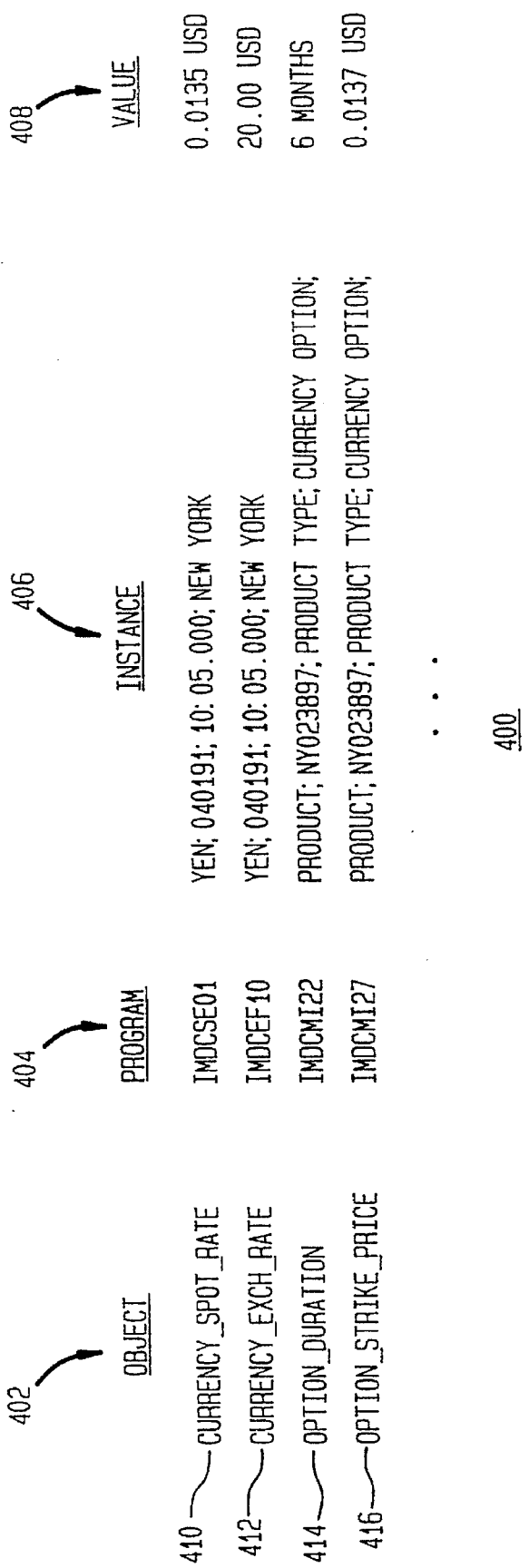
FIG. 4 is an object instance table.

In general, the present invention in a preferred embodiment is a rule-based computer-based application structure for the interpretation, calculation and/or presentation of information for a corporate management information system. The invention addresses the need to provide a dynamic environment to define rules to manage financial risk. It uniquely addresses this requirement by providing a structure whereby business professionals (without programming or software expertise) can define exposure and risk rules by creating an object-based reference system for financial data. The present invention solves the problem of rule logic being stored in a complex application programming which is not accessible by a business professional unless they have extensive software or programming expertise.

The preferred embodiment of the present invention is a MIS for financial applications. However, the present invention is not limited to financial applications, but can be employed in any industry or vertical market where a rule-based computer system finds application.

Preferred Environment

The present invention was developed for use in a Global Risk Management System (GRMS). GRMS is designed to provide financial institutions the functional and system capabilities to support a cross-enterprise view of risk management information. GRMS allows a financial institution to implement risk management in a consistent and timely manner, taking into account the dynamics of the marketplace.

GRMS interfaces with operational systems and management information systems. Operational systems provide GRMS with business event data in the form of transactions or balance updates. Management information systems provide GRMS with reference data such as: product, organization, and economic data. GRMS also interfaces with market data providers to obtain information such as, for example: foreign exchange rates, market prices and counter party ratings. All of this data is collected by the system in order to create the reports needed by management to make decisions.

GRMS was developed as a corporate management information system application based upon the data architecture outlined by the Corporate Management Information Model (CMIM) sold by the IBM Corporation of Armonk, N.Y., USA, under product identification No. 5799-T8W and described in IBM brochure No. D5206836.

A typical GRMS structure (architecture) is shown in block diagram form in FIG. 1. A system 100 contains a host processor 106 which accesses GRMS applications 108 and other operational systems in communications to support remote local area networks 120. GRMS 108 is intended to function on the same host system as other Corporate Management Information System (CMIS) applications, but it can be standalone if desired.

The specific hardware and line protocol for the typical GRMS configuration of the present invention is as follows (all components are IBM unless otherwise noted):

102 3390 Direct Access Storage Device
104 n/a
106 ES/9000 or System 3090 Host Processor
108 ES/9000 or System 3090 Region
110 PS/2 workstation
112 4029 printer
114 LU6.2 Application to Application Program protocol
116 3745 Communication Controller
118 PS/2 workstation
112 IBM Token Ring
122 4029 printer
124 LU6.2 Application to Application Program protocol
124 ES/9000 or System 3090 Host Processor
126 IBM 6611 Network Processor
126 ES/9000 or System 3090 Host Processor
128 LU6.2 Application to Application Program protocol In general, GRMS 108 is an event driven system. All significant inputs are treated as events that GRMS must process and analyze to produce information for exposure and risk management. Systems throughout an institution utilizing GRMS can generate transaction records and files that GRMS will receive and queue for analysis. The term "queu" means putting into a list where the items in the list are processed in a first in first out order.

Transactions will be placed in a queue and evaluated for event type. An event type is a type of business activity such as the repayment of a loan or an interest rate increase. When the event type is determined, the routing of the event is determined by GRMS 108. A business event may be analyzed multiple times for different scenarios. The scenario is the set of rules and data that must be acquired to perform an exposure and risk calculation. When the rules and data are acquired, the calculations are performed.

Files sent to GRMS from external sources will also be processed into discrete events. A file is a structural collection of information that is comprised of records. GRMS 108 will decompose the files into event messages that will be processed through the GRMS system. Each file can be recognized into this system of event messages following a set of rules established for the file type.

Data and rules will be stored in the GRMS database 102. The data will be stored as a relational database, preferably utilizing the IBM database DB2 or other comparable relational database, and are part of the CMIS database 102. Rules for GRMS will be stored as objects in the database. The term "object" is an abstraction (like a variable in mathematics) that represents a value that is returned by an associated retrieval program. The object concept of the present invention allows the rule to be reused for different data applicable to many types of events.

Once the calculation is performed in GRMS, the result of the calculation is passed to a result handler. The result handler will also have rules to follow for the disposition of the result. Results can cause an update to the CMIS database 102, a long report to be created and routed to one or many people of the organization, or no further action.

A business professional may also request an ad hoc report. This request is converted into an event that GRMS 108 will process in the same manner. The report request enters a queue and is recognized as a report event. The data and rules for the report are acquired and passed to the GRMS Processor. When the results are generated, the information (result) is handled accordingly to the rules for the report. Typically, the report is then sent to a distribution list in a prescribed format.

The GRMS work station (e.g. 118) allows the business professional to enter transactions for GRMS via graphical screens. The work station 118 has the ability to view and print through ports delivered to it. This work station 118 can also be used to analyze exposure and risk data locally using rules and work station analytical tools. The business professional can then add her own preferred tools such as spreadsheets, financial modelers, and graphic tools, and utilize the GRMS data generated in a query or report.

The GRMS calendar function has the ability to store event messages. Each message will have time and date parameters associated with it. When that time and date occurs, the calendar function will initiate at the event message. GRMS 108 will process the event message and utilize the rules that are stored for that event. The events triggered by such a message could include a mark-to-market activity after an exchange closing, generation of a report for the individual accounting, or an initiation of a query outside of the GRMS system 108 to a market information provider. These events will flow through the GRMS system 108 in the same manner as all other events and utilize the rule concept.

Rule-Based Concept

A key aspect of the present invention as implemented in the GRMS 108 is its ability to permit business professionals (without programming or software expertise) to specify rules which are translated into a system form for execution by application programs within the GRMS environment.

The selection of the rules is based on two criteria:

(1) elements that are unique or proprietary to the financial institutions (such as exposure and risk rules and behavior conditions); and (2) elements that are necessary for GRMS growth in supporting new system feeds (using the information format mapping) in new products (specified by product-like life cycle definitions).

The rules concept permits the installed GRMS 108 solution to be altered and amended according to the business professional's specifications in these key areas without requiring massive modifications to the system.

The GRMS system 108 is rule-enabled, in that its internal design and implementation structure supports the rule execution concept. The storage form of these rules is a relational database of the data and logic needed by the system 100 to execute the rules.

The enabling for calculation and behavior rule has two levels.

There is a high-level relational data structure of objects and simple operations (object operators can be either logical (when..and..then..) or mathematical (+, _, *, /) depending on context) that are used to combine the values of the objects. At this level, objects can be defined in terms of other objects (which implements a nested expression concept) or can be linked directly to an associated program that is called to retrieve the object's value in rule execution.

The lower-level tier consists of these associated programs that derive the values for the data objects. These programs can be simple retrievals of data (e.g., attribute values from CMIM entities) or complex calculations such as an option pricing rule (which in turn may use the object structure to retrieve values for its calculation processing).

The GRMS architecture enables an object-based reference system for financial data. GRMS is a based on the IBM Corporate Management Information Model (CMIM) as the information architecture for the institution. An information architecture is a defined general structure for the institution's data. The structure consists of entities, relationships and attributes. Entities are items of data, such as "product" or "account". Within the actual database these entities have many representations; for example "product" could have representations "personal loan", "certificate of deposit", "checking account". Relationships are expressions about how the entities are related to one another.

For example, "product" would be related to multiple representations of "account". This would be known as a one to many relationship.

Attributes are individual factors that make up an entity. For example, "Product" could have attributes of "Product type", "Product Owner", etc.

In accessing the database, it is the values of the attributes of the entities that is the goal. A particular entity representation is located by navigating through the entities through the paths defined by the relationships of the information architecture.

GRMS 108 includes a general accessing program that uses as parameters the identifiers for the seminal entities of CMIM: PRODUCT, MANAGEMENT UNIT, GEOGRAPHIC REGION, LEGAL PARTICIPANT, CUSTOMER, CUSTOMER ACCOUNT, FIRM ACCOUNT, PORTFOLIO, MARKET SEGMENT, USER DEFINED FACILITY.

These entities are important because there is a path from one, multiple or a combination of them to each entity in a database modelled on CMIM. Thus a common accessing routine is used that uses as parameters, the entity identifier and attribute identifier desired along with the values of the seminal entities listed above. The accessing program returns the value of the attribute along with a return code signifying the result of the access processing (e.g. "successful", "entity representation does not exist", etc.). In this way, a standard accessing layer to the institution's data exists and, therefore, all the attributes of the database are available via this layer. This layer is shown in FIG. 2 in the boxes labeled "Retrieve Value" 220, 222, 232, and 234.

GRMs adds a table driven structure in front of these accessing programs so that the attribute representations can be referenced by name; these names can be thought of as variables that would appear in mathematical formulas. An example of this table is shown in FIG. 3. The names or "objects" are shown in the columns "OBJECT" 302, "OBJECT1" 304 and "OBJECT2" 308. These names or "objects" stand for a multitude of particular instances of the data, any of which can be retrieved by specifying the identifiers of the entities listed above which would focus the access on a particular representation value.

Also illustrated in the Table in FIG. 3 is the capturing of a complex formula as an object in the system. The processing of the object table 300 will result in a call to the program listed in the PROGRAM column 310. In the case of CMIM attributes, this program will be a generalized accessing program. However, the program could also be one that does a complex calculation; in the case of the one illustrated in FIG. 3, the program is named "Black_Scholes_Pgm" 312, which is a program that would use the standard Black-Scholes algorithm to calculate the value of the option at a point in time. Please note that the Black-Scholes Algorithm involves the use of integral calculus and therefore could not be represented in the Object table structure. However, its complex algorithm is encoded as a program and then referenced as an object through the normal mechanisms of the program.

FIG. 2 illustrates a sample rule 202 and shows the equivalent object structure in a tree-like representation 200. The high-level rule (option_exposure=currency_conv_rate * option_value 202) calculates the exposure of an option (option_exposure 204) as the currency conversion rate (currency_conv_rate 210) multiplied ("*"206) by the value of the option (option_value 208).

The currency conversion rate (currency_conv_rate 210), in turn, is expressed as another rule: currency spot rate (currency_spot_rate 228) minus ("-"226) currency exchange rate (currency_exch_rate 230). Those two objects are obtained by direct retrieval programs 232 and 234 from the databases. The currency spot exchange is retrieved from a market information database 236, while the currency exchange rate is obtained from the CMIM database 224. The direct retrieval programs (220, 222, 232 and 234), preferably written in a structured query language (e.g. SQL), utilize the key structure defined by CMIM to access the requested values from the data base 224.

The value of the option (option_value 208) illustrates an object that is a more complex program that utilizes objects within its logic. These objects, shown as the option's strike price (option-strike-price 216) and the option's duration (option-duration 218), are obtained by accessing the object table in the programs that are associated with those objects.

Turning to FIG. 3, the object table 300 for the rule of FIG. 2 is shown. The first line of the table 314 expresses the concept that the option exposure is composed of the currency conversion rate (object 1 304) multiplied (operator 306) by the option_value (object 2 308). No program is involved at that level. The second line of the table 316 shows that the currency conversion rate decomposes into the sum of the currency spot rate minus the currency exchange rate. Again, no program is involved at that level. The third line of the table 318 shows that the currency spot rate is obtained by the program IMDCSE01 320.

Similarly, the fourth line of the table 322 shows that the currency exchange rate is obtained from the program IMD-CEF10 324. The fifth line of the table 326 shows that the option value is obtained from a program called Black Scholes (Black_Scholes_Pgm) 312 (a well known complex financial calculation). The sixth line of the table 328 shows that the option duration is obtained by the program IMD-CMI22 322. The last line 330 of the table shows that the option strike price is obtained by the program IMDCMI27 334.

Conceptually, the present invention can be divided into two parts:
(1) the definition environment, and
(2) the execution environment.

In the definition environment, rules can be created and modified. In the execution environment application programs utilize the rules to perform risk calculations.

In the definition environment, rules exist in three forms.

Figure 5:
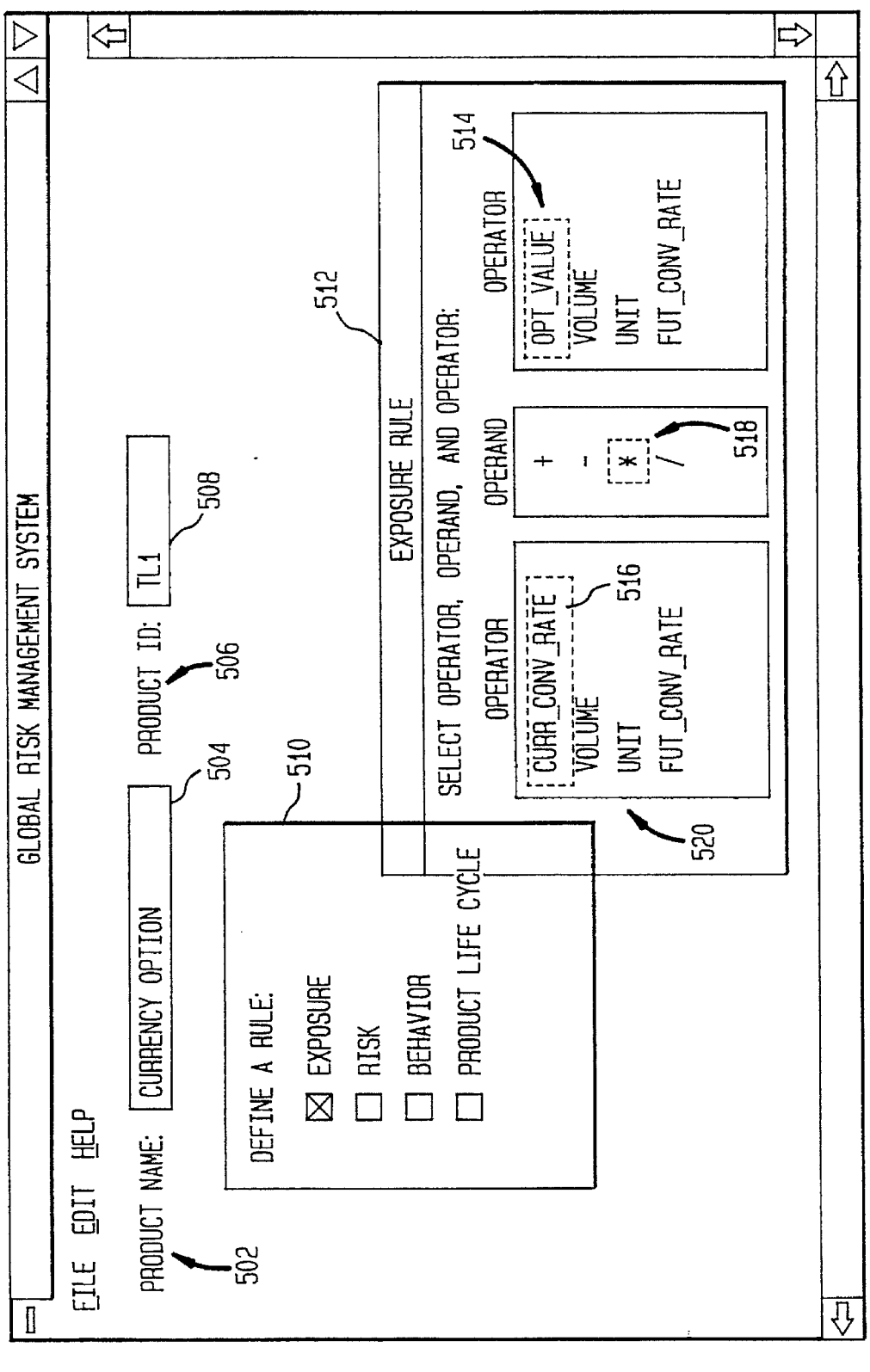
FIG. 5 is a pictorial representation of the presentation form of a rule utilized in a preferred embodiment of the present invention.

The presentation form of a rule is the form in which the rule, shown in FIG. 5, is presented to a user. This format is intended to provide a business professional, not a computer programmer, with an easy to understand expression of the rule. This is the format in which the business professional can modify existing rules or create new rules.

In the execution environment the business professional (user) is presented with a menu-driven interface 500 to define exposure and risk rules. A set of primitive objects are defined within the system and appear as selecting choices for the business professional, as shown in FIGURE 5. The operator choices are: curr_conv_rate, volume, unit, fut_conv_rate. The operand choices in this example are: arithmetic, (_-/*). In this example, the rule defined is: option_exp=currency_conv_rate * option_value. The objects curr_conv_rate 516 and option_value 514 were already defined in the object table 300. Currency_Cony_Rate is a complex object that decomposes into two primitive objects: Currency_Spot_Exch and Currency_Exch_fee. Option_Value is a primitive object and is related to a complex program Black_Scholes_Pgm 312.

The storage form of a rule, shown in FIG. 3, is in the form of a table 300, which is the format in which the rule is stored in the database. This is the format which application programs obtain from the data base in the same manner other objects are obtained. The application program can then process the table to execute the rule it represents.

The language form of the rule 350 is an intermediary step between the presentation form and the storage form. The language form allows changes made in the presentation form to be quickly and easily mapped into the storage form.

The system 108 internally edits the business professional selection prior to transforming the rule from presentation to storage form. Two general types of editing are performed:

Rule Decomposition Editing: ensures the rules are decomposed into defined primitive objects (for example, data access programs or complex formulas.

Language Construct Editing: ensures the rule is constructed within the defined language formats. (for example, operator, operand, operator)

Once the business professional's rule is edited and accepted, the system 108 loads the database 102 based upon defined table structures.

The concept of presenting a user with an easily understandable form of a rule which can be easily modified and then converted into a self contained storage form of the rule allows for ease of change to the rules and ease of creation of new rules. No changes need to be made to the underlying application software. No particular expertise in programming is required to modify or create rules.

AN EXAMPLE OF THE OPERATION OF GRMS

A Business Professional (the user) would want to create a new formula for the calculation of the exposure value of an option. The formula is shown in FIG. 2 as 202. The eventual result of his creation is the table shown in FIG. 3. The table at the beginning of the operation would consist of only the five lower rows of the table 318, 322, 326, 328 and 330. The result of the operation would be the addition of the first two rows 314, 316.

The user would use the presentation form 500 shown in FIG. 5 to specify the formula. To do this, he would first create an object called "Option Exposure" 510. He would then choose that it is an expression, and would be given a screen 512 from which he would specify the two "object" (like mathematical variables) involved in the expression and the operator. In this case, he would create a new object, "Currency_Conversion_Rate" 516 as one object, select "X" 518 (multiplication) as the operator, and select an existing object, "Option_Value" 514 as the second object of the expression. The data resulting from this is the first row of the table 314 in FIG. 3.

Since the user has specified a new object "Currency_Conv_Rate" 516 (an object not previously defined), in a similar way to the "Option_Exposure" flow, the Business Professional would select one existing object "Currency_Spot_Rate", the operator "–" (minus) and a second object "Currency_Exch_Rate" in order to define the new object within the table 300. The result of this set of actions is the second row of the table 316. At this point, the formula is complete, because all objects in the formula exist in the object table. Note that the "Black_Scholes_Pgm" referenced in the table 300, will also want to access objects in the table 300 in the course of its execution.

At this point, the Business Professional would want to test the formula to see the values it produces in order to confirm that it produces the desired result. The user specifies a specific product identifier (such as FXYN10735) which could represent a Foreign Exchange Option in YEN for a specific customer by customer identifier (such as CUST003002 for John Smith). This is accomplished by the user via a graphic screen interface 500 entering the identifiers and the system 108 retrieves the values of the entities needed for accessing the database and processes the rule against that data. In this case, it could be (for example):

| | |
|---|---|
| PRODUCT | "FXYN10735" |
| MANAGEMENT UNIT, | "FX Trading" |
| GEOGRAPHIC REGION, | "Japan" |
| LEGAL PARTICIPANT, | null |
| CUSTOMER, | "CUST003002" |
| CUSTOMER ACCOUNT, | "GL00112" |
| FIRM ACCOUNT, | "Corp.XYZ" |
| PORTFOLIO, | "CUST003002" |
| MARKET SEGMENT, | "Yen" |
| USER DEFINED FACILITY | null | where FXYN10735 is the identifier foreign exchange option in yen and CUST003002 is the identifier for John Smith.

This would be used as the standard access list for the accessing program to use in obtaining the values of the various objects in the table 300.

At this point, the evaluation of OPTION_EXPOSURE 300 for the specific option would begin. The GRMS processor 108 would start with the first row of the table in FIG. 3. Since the entries for the columns under OBJECT1 304 and OBJECT2 308 are not null, the processor would attempt to obtain the values for the objects in these columns ("CURRENCY_CONV_RATE" and "OPTION_VALUE") before continuing with the evaluation of the expression. In a recursive way, the processor 108 would search for the first object, "CURRENCY CONV RATE" which is defined as another expression in row 2 of the table. The processor would again recursively call the table 300 to obtain the value for object "Currency_Spot_Exch", which is defined in row 3 of the table 300.

"Currency_Spot_Exch" has "null" values in the expression-related columns ("OBJECT1 304, "OPERATOR" 306, and "OBJECT2 308"). These null values indicate a row which represents an object that is derived by invoking the accessing program, identified in column "program" (here, program IMDCSE01). So the GRMS Processor would invoke the program "IMDCSE01" 320 with the standard parameter list shown above. The program "IMDCSE01" would first form an identifying string for the value requested, which in this case is "YEN;040191;0:05.000;NEW YORK". This string uniquely identifies the value to be retrieved, and comprises attributes associated with the entities in the parameter list and other elements such as date and time.

The processor then would check for a prior retrieval of this value in its Object Instance table (for example, 400 of FIG. 4) associated with this report. Since this is the first access, the table would be empty, and the program would complete the processing of the retrieval from the actual database. Once the value is retrieved, the last action before returning would be the creation of an entry in the GRMS Object Instance Table for the value. This entry is shown as the first row 410 of the table 400 in FIG. 4. A similar processing would be done for the "Currency_Exch_Rate", which would result in the second entry in the table 400 of FIG. 4. Each time a rule is executed, an object instance table containing the primitive value used by the rule is created.

Once the values for both these objects had been retrieved, the expression can now be evaluated as "20.00USD-0.0135USD" resulting in a value of "19.9865USD" being assigned to "Currency_Conv_Rate".

The accessing of "Option_Value" proceeds along similar lines, although now the program called is not merely accessing the value, but calculating it. I% in turn will need to access the object table to have values retrieved for it for the object "Option_Duration" and "Option_Strike_Price". It will use the GRMS processor 108 to achieve this access. As before, the retrieved instances of the objects will be stored in the Object Instance table, in this case in rows 3 414 and 4 416 of FIG. 4.

Once the program returns the value for the "Option_Value", the GRMS Process 108 now has the values for both objects in the initial expression and can calculate the actual value for the Option_Exposure as the product of the two values. At this point the value is returned and placed into the report that is shown to the customer. As part of this report process, the Object Instance table 400 created in this processing and shown in FIG. 4 is returned to the Business Professional's workstation 118 for reference purposes.

An additional feature of the GRMS architecture is the placement of the GRMS processor on the Business Professional's workstation 118 along with the Object Table 300, and the programs defined in the object table 300. Since the object instance table 400 is also present, the Business Professional can change values in the Object Instance table (via GRMS screens and functions) and reprocess the report on the workstation. All object accesses will be satisfied by the Object Instance table function and therefore, the CMIM database 224 is not needed for this "What if" analysis reporting.

Once the user is satisfied with the product calculation formula, he can, but need not, direct that the formula represented in the Object table 300 be transformed into an equivalent program for improved execution time. (Note: Storing the formula as a program instead of as an object table would only be done to meet performance objectives.) The final program would utilize the accessing programs but would change the formula rows into sets of simple programs. For example, if the transformed program were named OPTEXP, the first row of the table in FIG. 3 would be changed to:

| OBJECT | OBJECT1 | OPERATOR | OBJECT2 | PROGRAM |
|---|---|---|---|---|
| Option_Exposure | null | null | null | OPTEXP | and the second row would be deleted.

This final program would follow the standard accessing protocol described above. In execution, this translated program is executed in a similar manner to the interpretive processing of the GRMS Processor, but would be faster. An object instance table would be created per each report request as objects are accessed and values retrieved.

In the execution environment, the application program executes individual rules by locating the object table of the rule stored in the database and then processing that table.

The rules are located in the same manner as other data objects stored in the data base. The application program indexes the table based on the rule name. It traverses the object table to identify all primitive objects which are related to the rule name. The primitive objects are either data access programs or complex formulas. Primitive objects do not decompose into additional objects, rather they are related to programs which access data from a database or perform complex calculations.

An example of the object table structure and specific data related to the object exposure rule is provided in FIG. 3. Within FIG. 3, an example of the data access program to access the Option_Duration is IMDCMI22 332; and an example of a complex formula to determine the Option_Value is Black_Scholes_Pgm 312. All primitive objects which are data access programs are based on the information architecture of CMIM. CMIM defines the standard key structure for processing information from the relational database. This key structure combined with a standard query language provides a uniform and consistent way to access the database 102.

The present invention is a risk management system which utilizes a rule based application structure which stores the rule logic as data objects. A business professional can modify and create rules without changing or even understanding the underlying software.

IMPLEMENTATION OF THE INVENTION

The section titled "System Architecture" describes the initial division of GRMS into major parts called components.

The subsequent sections and the referenced Figures contain the two major forms for documenting a computer system design: a process model and a data model. A process model is a hierarchical set of diagrams in which the system is divided into processes (represented by block boxes) and these processes are connected by lines that denote the flow of data from one process to another. The set is hierarchical because each process on the highest level chart is further defined as subprocesses and then represented as a diagram by itself on a separate page. The refinement continues until all processes on the page are self-evident and there is no further need to refine them.

A description of the process model methodology and symbology is given in the subsequent section titled "Process Model Specifications".

The other element in the design of the computer system is the data model. A data model is a set of diagrams in which the system is divided into entities (represented by block boxes) and these entities are connected by lines that denote the relationship of entities to each other.

A general description of the GRMS data is given the section titled "Data Model Specifications".

Figure 13:
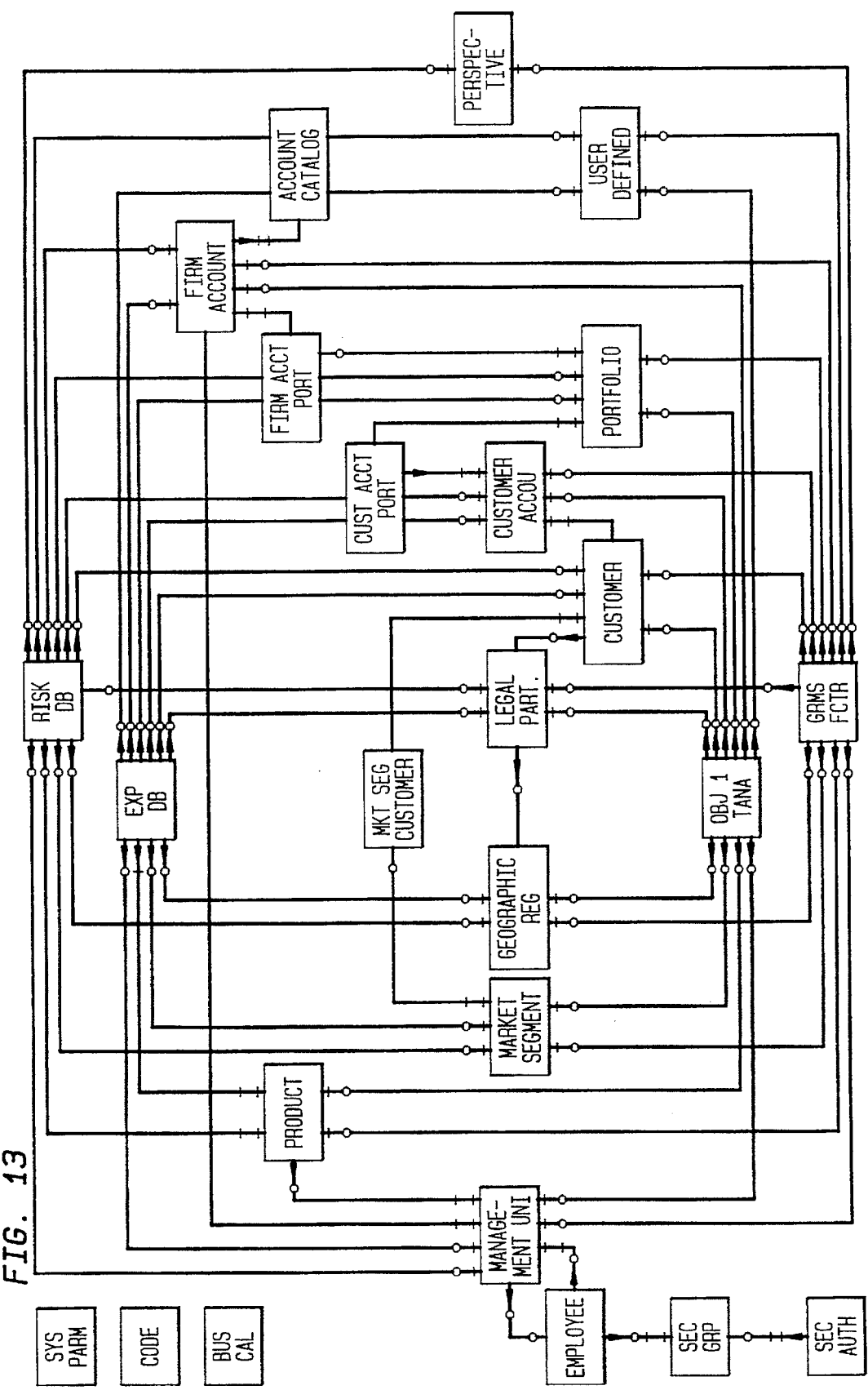
FIGS. 13 and 14 are data flow diagrams for a preferred embodiment of the present invention.

The data model that details the relationship of entities in CMIM to GRMS data entities is shown in FIG. 13.

Figure 14:
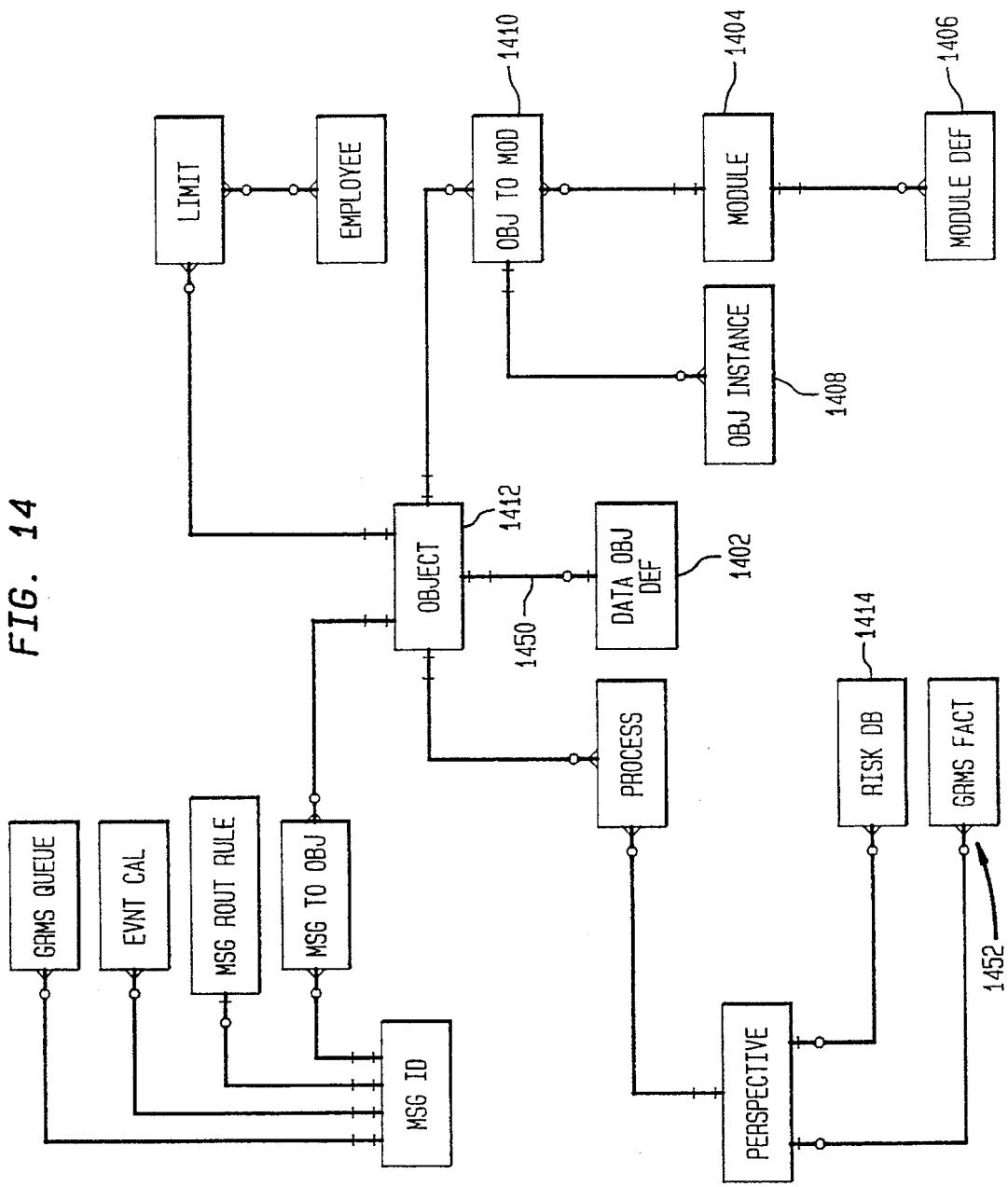

The model for the data of the subject of the present invention is presented in FIG. 14.

For example, in FIG. 14 the data block labelled "Obj to Mod" 1410 is the table referred to in the description as the Object Table 300 ("Module" is a technical term for program). The data block labelled "Object Instance" 1408 represents the Object Instance table 400 in the description. "Data Obj Def" 1402 refers to a definition of the object to be retrieved in terms of its data type (e.g., Integer or Character), length, significance if a decimal point is involved, etc. The additional data in the diagram describes the messaging connectivity of the systems.

System Architecture

This section describes the initial high-level design for GRMS within the context of CMIS. The Section titled "System Structure," describes the structure of CMIS and GRMS in terms of its components.

3.1 System Structure

This section first describes the major functions of CMIS to put GRMS in the context of a solution to the information needs of financial institutions. It then describes common functions and services provided by CMIS and common to GRMS. These are described as CMIS capabilities but are presented in the context of how they are applied and used within the GRMS application.

The major system components of GRMS are then presented to complete the comprehensive system view of the GRMS system.

3.1.1 CMIS Structure

Figure 6:
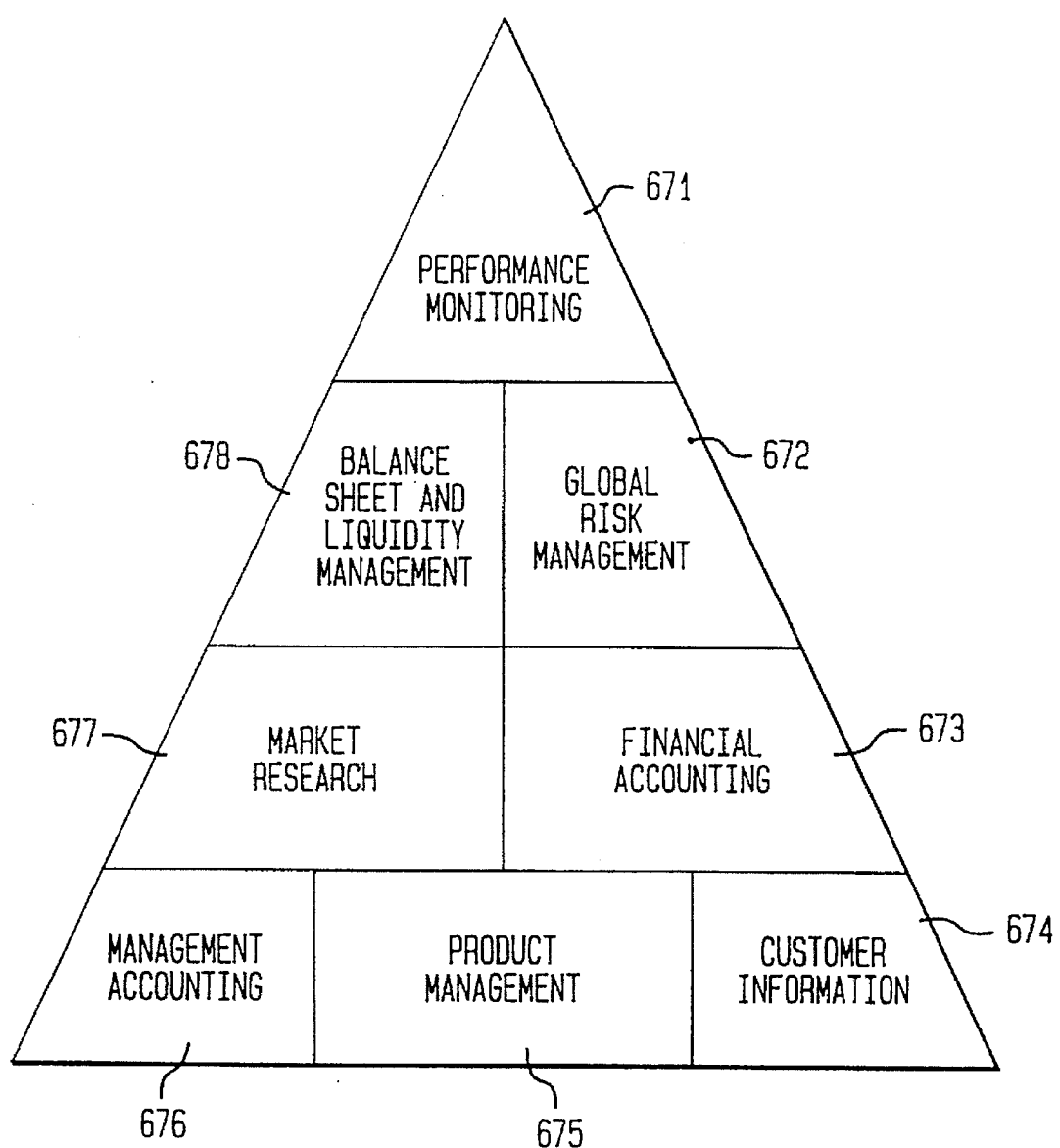
FIG. 6 is an overview of the functions supported by CMIM.

The need for a comprehensive management information system to handle the complex data requirements of today's financial community was the driving force behind the CMIS program. The business requirements of industry were collected and a set of eight business areas, common to all financial institutions,..were developed and are shown in FIG. 6. These areas are:

—Financial Accounting 673

—Management Accounting 676

—Customer Information 674

—Market Research 677

—Product Management 675

—Balance Sheet & Liquidity Management 678

—Performance Monitoring 671

—Global Risk Management 672

Although each of these application areas are functionally different, they each rely on the same set of financial information. It was important to identify this set of corporate management information before beginning to develop any of these applications. The Corporate Management Information Model (CMIM) was the result of this effort.

The CMIS system is the embodiment of all these common needs. It provides updates to the CMIS database, modeled after CMIM. It provides many common services including communications, external system fees, and other messaging.

CMIS Database

The CMIS database is based on the CMIM data model. The model is an identification and classification of strategic information need by a financial institution. It includes information about Products, Customers, Customer Accounts, Employees, Risk, Exposure, and other diverse types of information. It was designed so that each piece of information is represented in one place in the model. All of the CMIS applications use the data stored in this common, integrated database. The CMIS database is designed to be flexible and extendable, so additional types of data can be integrated within the framework provided.

CMIS Control, Interface and Common Services

The CMIS processes are illustrated in a subsequent section in the context of the GRMS Process Models.

CMIS provides the following common services:
—Global Communications:

CMIS provides common communications facilities to exchange transactions, messages and files between hosts and workstations. It utilizes standard IBM protocols including SNA's LU 6.2 for interprocess communications. CMIS will support connectivity across local area networks (LANs) and Wide area networks (WANs) to host processors using IBM connectivity solutions.

—External System Feeds:

CMIS will be a distribution point for transactions from existing systems within the company as well as external market information feeds. CMIS forwards the transaction and data, in the form of event messages, to the CMIS business applications for further processing.

—Other Messaging:

CMIS provides support for other types of messaging including interfaces to the institution's reporting system, the sending of messages to and from business professionals, and import/export data messages between host systems.

GRMS Structure

A typical enterprise GRMS configuration is shown in FIG. 1, described previously.

Components of GRMS Application Architecture

The components of GRMS application architecture include: GRMS Event Processor, Bank Operations Interface, Marketing Information Handling, Financial Information Delivery Component, Integrated Database, Global Communication, GRMS Developer and Risk Engineering.

The GRMS Event Processor is the control component of GRMS. It receives external and internal (to GRMS) events, analyzes them and initiates the appropriate processing modules.

The GRMS Event Processor is driven by several kinds of events from external and internal sources. From sources external to GRMS, it receives business and market event messages from the CMIS external system feeds component and processes them according to the product life cycle definitions. These events communicate to GRMS that new information has been updated on the CMIS databases (such as movements in product balances) that necessitates the recalculation of exposure. Within GRMS, the Event Processor receives events from other components, event calculators and processors, or from the Event Calendar. The Event Calendar is a service element that accepts requests for time-triggered events and generates these events at the appropriate time. These internal events, mainly report and query requests, and behavior rules checking requests, are processed and can cause GRMS calculations to occur and data to be queued to business professionals.

The heart of GRMS is its ability to calculate exposure and probable loss for various products in various states, based on a set of risk factors. When event messages are received (from CMIS, the GRMS Event Calendar, and business professionals), the calculators are executed, and data is optionally stored to the GRMS database.

The Bank Operations Interface component creates a standard interface to the operational systems of the financial institution. This component utilizes the information mapping rules to transform data received from operational systems into event forms that can be processed by the GRMS Event Processor Component.

Examples of this data are batch files of transactions and bulk account update files. The Bank Operations Interface component processes these files and generates events for all affected products.

The Market Information Handling component creates a standard interface for accessing market information in support of the calculation of exposure and risk values as well as the derivation of volatilities associated with market entities (e.g., equity prices, interest rates, currency exchange rates).

The Market Information Handling component has a two-tier structure. The lower tier is an encapsulation of the actual market information, both current and historical. This will be tailored to connect with the existing market information sources for the financial institution. The higher tier contains the statistical methods that utilize the actual market information to derive volatilities and correlations of the associated market elements.

The Financial Information Delivery component creates an advanced workstation environment for presentation and analysis of GRMS query data and reports. Function and information access is controlled by authority access definitions that are enforced by CMIS authority (general) and GRMS authority (specific) services.

As stated above, GRMS is an event-driven system. Messages, queries and report responses are queued for the business professional within the GRMS host components and then downloaded to the Financial Information Delivery workstation when the business professional logs onto GRMS.

The analyst is able to access product information, perform product analysis, and view reporting in the context of the operating area.

The GRMS queries/reports serve two purposes. First, they allow the business professional to get current or historic information in which to analyze the current risk of the financial institution. Second, they provide data to the business professional to perform GRMS Risk Analysis (described below).

There are a fixed set of queries/reports provided with GRMS. However, these queries and reports can be tailored by business professionals to achieve a wide range of reporting capabilities. For example, a general report to show exposure for customer accounts within a management unit can be tailored by the business professional to select the customer accounts within a specific management unit or specific group of management units.

In conjunction with a query or report, GRMS provides information to the business professional on the underlying values used in producing the query or report. This feature works as follows:

When a query is run on the host, all of the data used in running that query is stored in an "Object Instance Table." This table is sent to the business professional at his/her workstation and contains a diverse set of information: product names, customer identifiers, exposure values, risk factors-everything that was calculated as part of the query or found in any database table.

This information is key to the understanding of the derived exposure and risk values. It is also used by the GRMS Risk Analysis function to allow the business professional to perform "what if" analysis by allowing him to change the data used to produce a query or report. The business professional is able to change any or all of these values and rerun the query on the workstation-without any host input. The effects of changing risk factors and other key values can quickly be seen.

This approach allows the data on the host to always reflect accurate exposure and risk factors values that are undisturbed by "what if" analysis.

To support additional analysis, the object instance table can be imported into spreadsheet, graphics, or other analytical tools.

Figure 7:
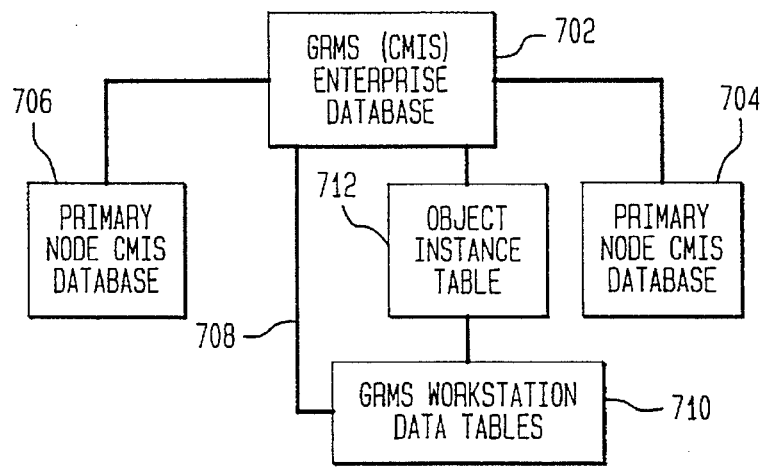
FIG. 7 is a diagrammatic representation of the data flow of a preferred embodiment of the present invention.

GRMS uses the CMIS database which is a relational database established and shared by other CMIS Applications (i.e., Customer Information, Product Management and Balance Sheet and Liquidity Management). The Integrated Database Component unites the various databases that comprise the GRMS system, as illustrated in FIG. 7. This figure shows configuration with multiple primary nodes 704 and 706. The Enterprise Database 702 would be the one for the entire bank while the other primary nodes' databases would reflect data for subunits of the enterprise (e.g., a domestic unit, foreign unit or foreign regional). Also illustrated is the connection 708 between a primary node (in this case the Enterprise node 702) and a workstation where the database (primary node) and the data tables 710 (secondary workstation node) are related by the Integrated Database components in each. Finally, the figure illustrates the connection of the object instance table 712 that, as a result of a query or report, is developed on the primary node and transferred to the secondary mode for use in query and report interpretation and risk analysis.

The component facilitates the exchange of database data between the Host-based CMIS database and the workstation database accessed by the Financial Information Delivery Component. In addition, it processes the GRMS rollup and rolldown information between the CMIS databases in the Enterprise node and other primary nodes.

Global Communication provides the means, within the CMIS Global Communication facilities, for the connection of several host GRMS systems to communicate and exchange transactions, events and data (e.g., messages, report and query responses, roll-up and roll-down information to be processed by the Integrated Database component).

The GRMS Developer provides the mechanisms for the storage of the user-defined rules in a repository and for the translation of those rules into an execution form so that they can be tested and eventually placed into the execution environment.

The Risk Engineering component creates an advanced workstation environment for definition and maintenance of various types of rules that are used in GRMS. As with the Financial Information Delivery component, function and information access is controlled by authority access definitions that are enforced by CMIS authority (general) and GRMS authority (specific) services.

The Risk Engineering component uses advance presentation facilities to create and modify queries and reports, exposure and probable loss calculations and behavior rules. The component has supporting programs that analyze the rules both syntactically and semantically, and report back any problems found such as formulas that use undefined variables or queries with an excessive projected processing time. It contains the facilities to simulate rules for testing.

Process Model Specifications

The present invention was developed using the Information Engineering Workstation (IEW)™ and Application Development Workbench (ADW)™, from KnowledgeWare, Inc., to automate the design process. The output from these tools may be unfamiliar to some. This section is intended to help those familiar with structure design methods understand the information presented in the following sections. Although this section may help those unfamiliar with structure design concepts obtain some understanding of the information presented, it is not intended as a primer on structured design or structured design methodologies.

Data Flow Diagrams

Data flow diagrams document the logical processing that occurs within a system. They start at a high level and define the major functional components of a system with the data that flows between them. Each of the functional units (called Processes) that are defined on the high level diagram are decomposed on lower level diagrams. This process of functional decomposition continues until the problem is broken into pieces which are at a low level and clearly understood. Two processes may be at the same functional level with one easy to understand and explain and the other complex and needing further functional decomposition. Therefore, not all processes are broken down to the same level.

Figure 8:
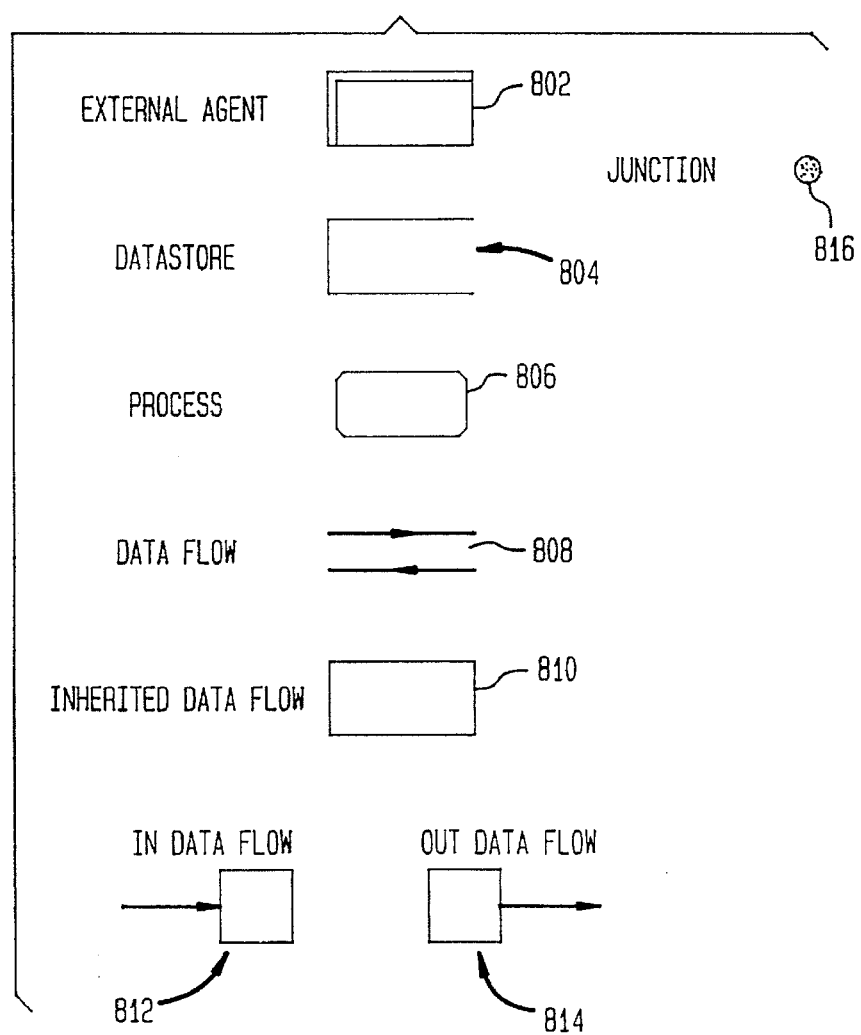
FIG. 8 shows the elements used in FIGS. 9–14.

The data flow diagrams contain a number of symbols as shown in FIG. 8. The symbols are explained below.

External Agent 802 represents a process, set of processes, system, set of systems, a user, or any other data feed that is considered outside of the application being designed.

Datastore 804 represents a functionally oriented repository for data. It may actually become a database table, an in memory table, or other representation in the technical design.

Process 806 represents, at some level of detail, a functional piece of work that will be part of the application. As the charts get to a lower level, the processes become more detailed.

Lines with arrows in the middle represent data movement, called Data Flow 808. The direction of the arrow represents the direction that the data moves.

Inherited Data Flow 810 represents a data flow into the process on this diagram's parent diagram. These symbols will have one of two symbols inside, as shown in FIG. 8. The "In Data Flow" means that data is flowing into this diagram. The "Out Data Flow" means that data is flowing out of this diagram.

Solid black circles 816 are simply junctions used to break up or combine data flows. Data flows may be broken up into more specific flows or simply used to send the same flow to more than one destination. The IEW/ADW tools always create a junction box to connect inherited data flows.

Figure 9:
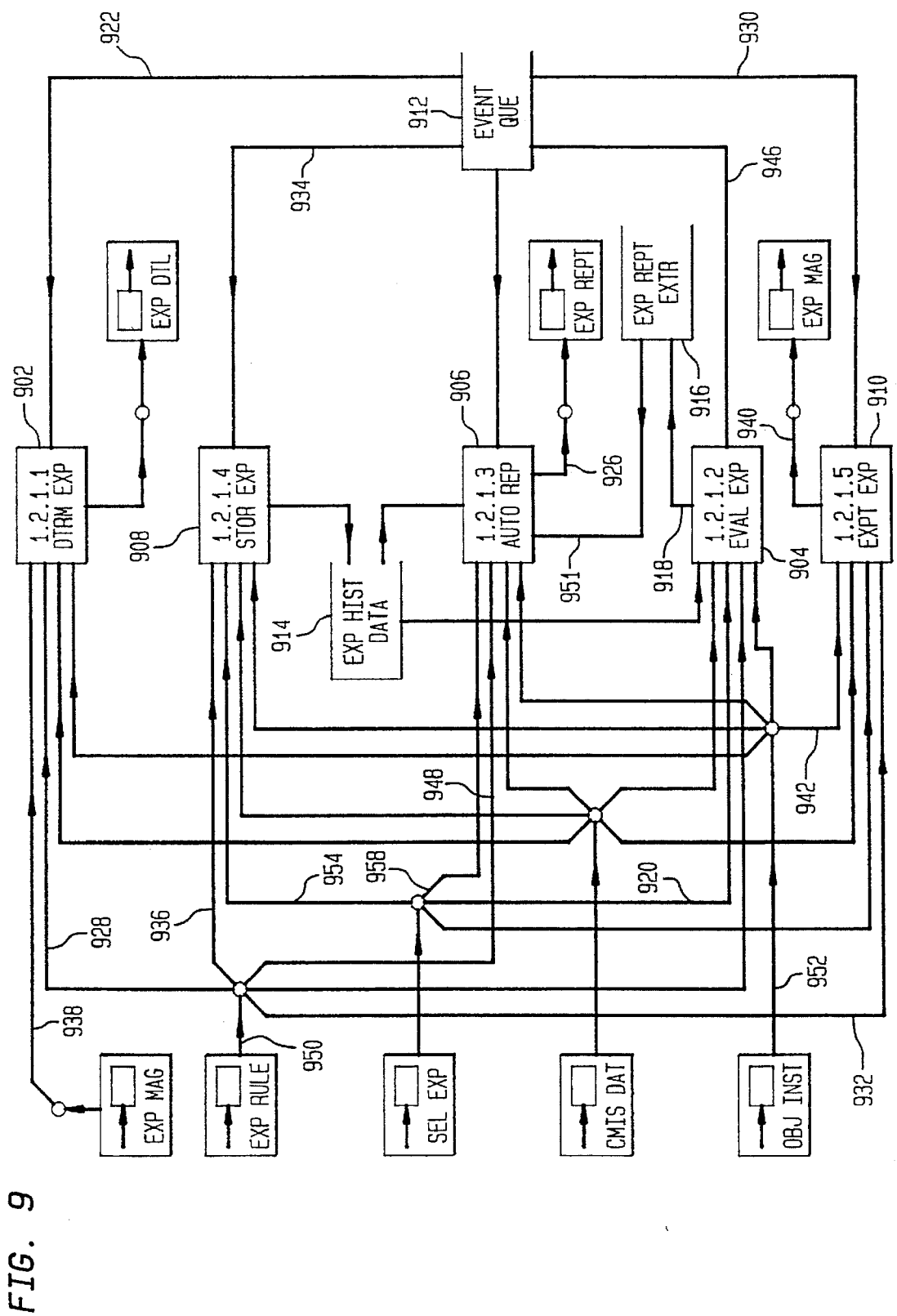
FIG. 9–12 are process diagrams for a preferred embodiment of the present invention.

Description of Process Flow Diagram in FIG. 9

—Process: 1.2.1.1 Dtrm Exp 902

For each CMIS exposure event, look up the exposure type and calculation rules and calculate the appropriate exposure amounts by exposure type. This process is rule based to allow the user to define the applicable risk types affected by a specific product and its associated transaction.

The first step is to look up the appropriate risk type identification rules for the event based on product types and other user defined criteria. Using these rules the risk types affected are determined and a separate exposure amount is created for each risk type. The results of these calculations are updated on the exposure database.

—Process: 1.2.1.2 Eval Exp Data 904

This process evaluates exposure details stored in the exposure database. It compares these exposure details against behavior rules, triggers violation reports and performs trend analysis of historic exposure data.

—Process: 1.2.1.3 Auto Rept on Exp 906

Automatically format and produce exposure and exposure evaluation reports when events which match the report rules occur. The process selects data from the requested datastores and produces a report as directed in the rules.

—Process: 1.2.1.4 Stor Exp Dtl Hist 908

This process creates an exposure history by reading the exposure datastore and moving selected exposure details to the Exp Hist Data. This process is rule based, allowing the bank to determine how long exposure data should stay on the exposure database and what historic exposure details are required.

The first step reads the exposure history rules. These rules are then executed against the exposure database to select the exposure detail records which meet the selection criteria specified in the exposure history rules. The selected records are then moved from the exposure database to the Exposure History Data, resulting in a reduced exposure database with quick access to the most current records.

This process is used to support historical trend analysis and is meant to complement standard DB2 archive functions.

—Process: 1.2.1.5 Expt Exp Data 910

Select exposure, object and rule data as directed by Exposure Export Rules and send that selected data to other GRMS installations via the GRMS queue.

—Data Store: Evnt Que 912

Datastore containing recurring and one-time events whose sources include user input, calendar triggers, market movement, revaluation of accounts notices (e.g., Mark-to-Market events) and CMIS transaction event triggers. Processes periodically examine this queue to complete calculations initiated by others.

—Data Store: Exp Hist Data 914

Historical exposure data as specified by the user defined history rules. The contents of this data includes exposure and balances as aggregated according to the Exposure Rules.

—Data Store: Exp Rept Extr 916

Extracted exposure data to be used by the GRMS reporting function.

—Data Flow: Anal Exp Data 918

This data includes the definition of the scenario that has been analyzed And the exposure values resulting from this analysis.

—Data Flow: Behv Rule 920

Rule used to monitor exposure or risk for abnormal situations, for example, to determine the existence of excessive exposure amounts.

—Data Flow: Calc Exp Evnt 922

This is a trigger to calculate exposure amounts.

—Data Flow: CMIS Data 924

Data stored in the CMIM defined CMIS database. This data is required by multiple CMIS business applications. It includes bank organizational data, customer data, product attributes, account details, performance measurements, price data.

—Data Flow: Exp Dtl 926

Exposure details to be stored in the exposure datastore. The attributes included may vary based on risk type(s) and other user definable criteria.

—Data Flow: Exp Dtrm Rule 928

A set of user defined rules that define the risk types whose exposure values will be updated by a particular CMIS event, the calculation to determine the exposure value and the object data required to calculate the exposure.

—Data Flow: Exp Expt Evnt 930

Events which initiate the export of exposure data. Can be triggered by calendar, user, or other process.

—Data Flow: Exp Expt Parm 932

Parameters defining exposure data to be exported to other nodes.

—Data Flow: Exp Hist Evnt 934

Events which initiate storing of historic exposure details.

—Data Flow: Exp Hist Parm 936

Parameters that determine what exposure details are to be removed from the exposure database and moved to the exposure history database.

—Data Flow: Exp Msg In 938

This message contains the occurrence of an event and/or balance data, indicating that an exposure balance must be recalculated. This data includes CMIS records and exposure balances received from other remote GRMS applications.

—Data Flow: Exp Msg Out 940

Exposure calculation results to be sent to other CMIS applications or installations.

—Data Flow: Exp Obj Data 942

Exposure object data (e.g., Product attributes).

—Data Flow: Exp Rept 944

Rule driven exposure reports triggered by the occurrence of an event which meets the requirements to create a report (e.g., time, system data transfer).

—Data Flow: Exp Rept Evnt 946

Exposure report events triggered by an exposure calculation, a user query request and/or calendar event that meets the rule instance to automatically execute the exposure reporting process.

—Data Flow: Exp Rept Rule 948

User defined rules used describing the format and event triggers to automatically initiate reporting of exposure data.

—Data Flow: Exp Rule 950

User defined rules defining the variables to use and the algorithms to employ when calculating exposure.

—Data Flow: Extr Exp Rept Data 951

Extracted exposure report data. Data within these extracts includes behavior analysis and exposure details.

—Data Flow: Obj Inst Data 952

Any object data required to support rule execution, behavior rule monitoring, exposure and risk calculations, reporting and query.

—Data Flow: Sel Exp Dtl 954

Selected exposure details required by Proc Risk Data, Exposure reporting and query, Exposure Export and Exposure history rules.

—Data Flow: Sel Exp Hist Dtl 956

Selected historic exposure detail to be logically restored onto the exposure datastore to support historical trend analysis.

—Data Flow: Sel Rept Exp Dtl 958

Selected exposure detail required by the exposure reporting rules to complete the report.

Figure 10:
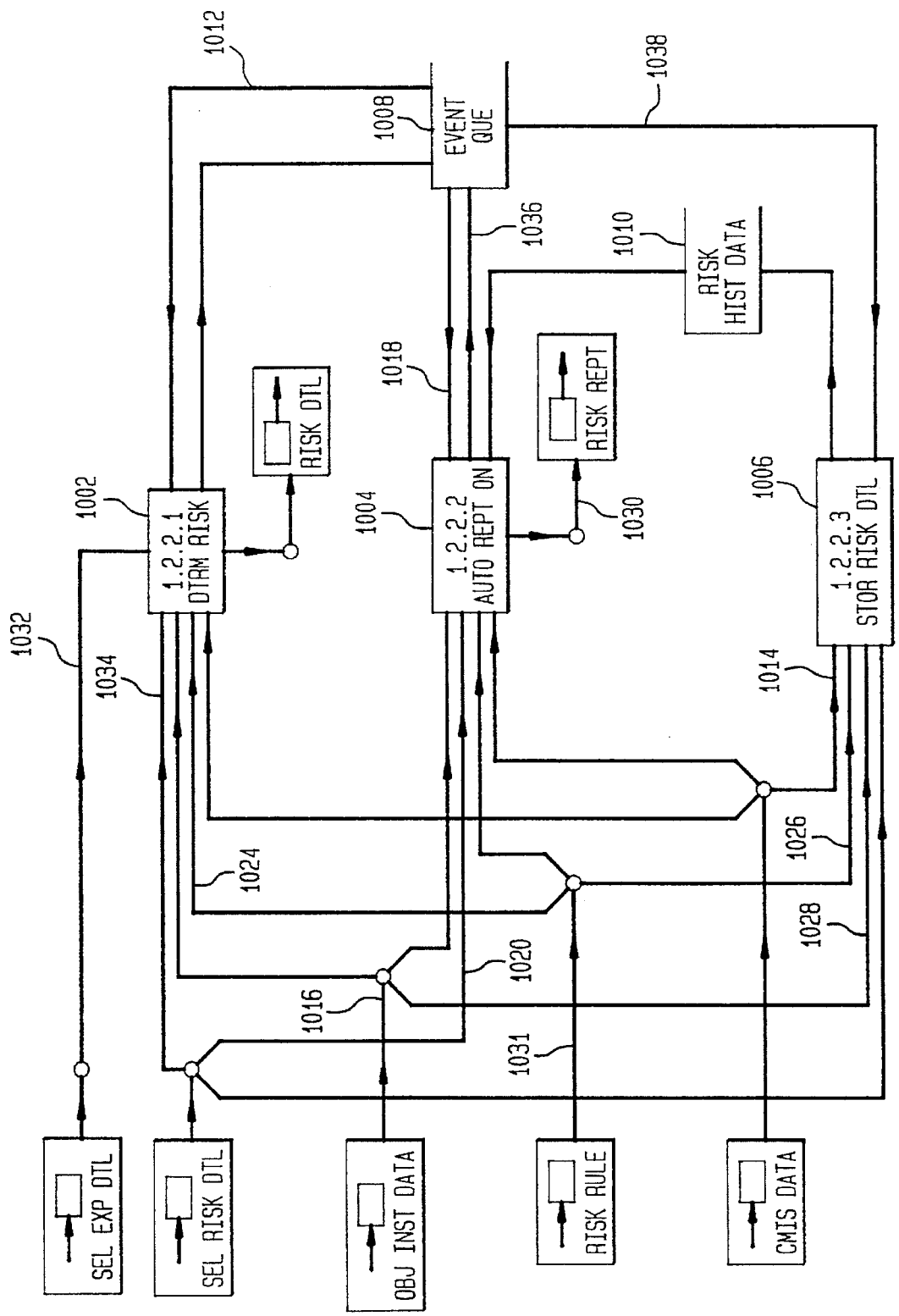

Description of Process Flow Diagram in FIG. 10

—Process: 1.2.2.1 Dtrm Rick 1002

Calculate risk, initiate automated reports of risk, and maintain a history of selected risk details. Execute these functions as specified in GRMS rules using CMIS data.

—Process: 1.2.2.2 Auto Rept on Risk 1004

This process receives report requests from reporting rules, selects data from the requested databases and produces risk reports. These reports are created when events occur (defined by the reporting rules) which meet the report criteria.

—Process: 1.2.2.3 Stor Risk Dtl 1006

Store selected risk data by moving Risk Data details to the Risk Hist Data. This process is a rule-based process which allows for determination of which Risk Data details are important to maintain a history.

—Data Store: Evnt Que 1008

Datastore containing recurring and one-time events whose sources include user input, calendar triggers, market movement, revaluation of accounts notices (e.g., Mark-to-Market events) and CMIS transaction event triggers. Processes periodically examine this queue to complete Calculations initiated by others.

—Data Store: Risk Hist Data 1010

Risk history data. The contents of this data includes Probable Loss details over time.

—Data Flow: Calc Risk Evnt 1012

Request sent to the event queue and then to the Exec Risk computation process to trigger calculations.

—Data Flow: CMIS Data 1014

Data stored in the CMIM defined CMIS database. This data is required by multiple CMIS business applications. It includes bank organizational data, customer data, product attributes, account details, performance measurements, price data.

—Data Flow: Obj Inst Data 1016

Any object data required to support rule execution, behavior rule monitoring, exposure and risk calculations, reporting and query.

—Data Flow: Rept Evnt 1018

This is a trigger for generating a risk report.

—Data Flow: Rept Rule 1020

User defined risk reporting rules which specify the data, format and event triggers to automatically produce risk reports.

—Data Flow: Risk Dtl 1022

Results of 'Risk' computations to be stored in the Risk Datastore. The attributes included may vary based on risk type and other user definable criteria. The details include the results of Probable Loss calculations.

—Data Flow: Risk Dtrm Rule 1024

Rules instances specified by the 'Risk Perspective' to be executed in computing Probable Loss.

—Data Flow: Risk Hist Parm 1026

Parameters to specify what risk details are to be stored.

—Data Flow: Risk Obj Data 1028

Object data (e.g., Credit and Foreign Exchange risk factors, required by the risk calculation (e.g., Probable Loss).

—Data Flow: Risk Rept 1030

Risk report created when a user defined condition (rule) is satisfied. The condition may be a one time request or an automatic request which is triggered periodically.

—Data Flow: Risk Rule 1031

User defined 'Risk' rules describing the variables required and algorithms to employ when calculating Probable Loss, reporting of 'Risk' calculation results and storing selected 'Risk' details.

—Data Flow: Sel Exp Dtl 1032

Selected exposure details required by Proc Risk Data, Exposure reporting and query, Exposure Export and Exposure history rules.

—Data Flow: Sel Risk Dtl 1034

Selected risk details describing instances of probable loss calculations.

—Data Flow: Sel Risk Hist Dtl 1036

Selected historic risk details for use in performing historic trend analysis. This is logically restored onto the Risk Datastore to support historic analysis.

—Data Flow: Stor Risk Evnt 1038

Events which trigger risk details to be stored.

Figure 11:
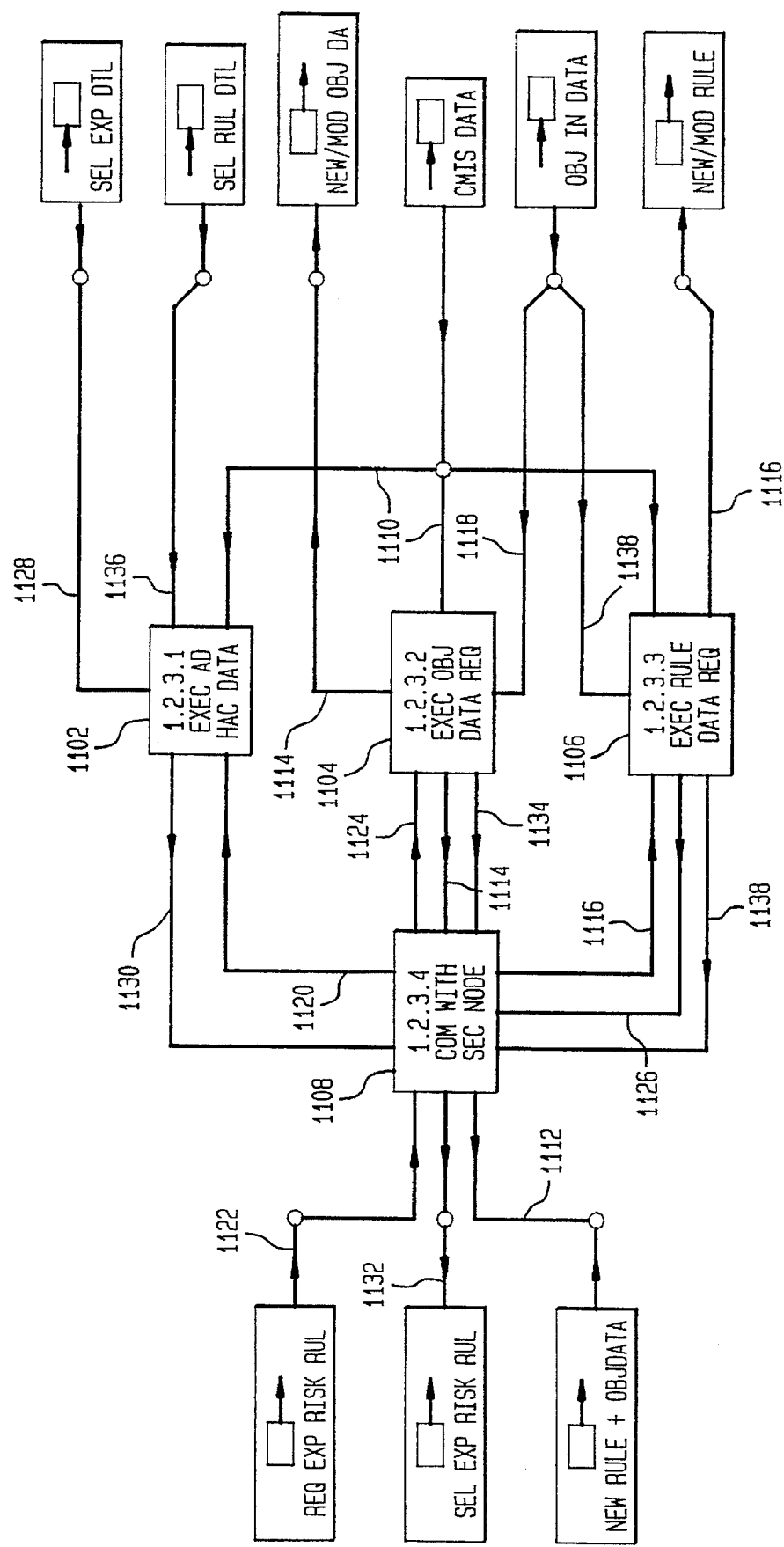

The following is a description of the process diagram in FIG. 11.

—Process: 1.1.31 Exec Ad Hoc Data Req 1102

Support the work station generated ad hoc report an/or query with selected exposure details, selected risk details and CMIS data.

—Process: 1.2.3.1 Exec Obj Data Req 1104

Process requests for object data from the secondary node. Additionally, updates to reference data are received and stored.

—Process: 1.2.3.3 Exec Rule Data Req 1106

Process requests from the secondary node for specific rules, exposure and/or risk data nd store and updates to data received from the secondary node.

—Process: 1.2.3.4 Com with Sec Node 1108

Manage data communications with FRMS secondary notes. Queue and decode the requests and respond with selected exposure, risk, reference and rule data, while receiving updated reference and rule data created at the secondary node.

—Data Flow: CMIS Data 1110

Data stored in the CMIM defined MIS database. This data is required by multiple CMIS business applications. It includes bank organizational data, customer data, product attributes, account details, performance measurements, price data.

—Data Flow: New Rule & Obj Data 1112

Updated rule and object data sent to the Primary Node from the Secondary Node.

—Data Flow: New/Mod Obj Data 1114

Updated object data to be sent to the CMIS database, other CMIS installations and/or secondary nodes.

—Data Flow: New/Mod Rule 1116

Updated rule instances created and/or modified and tested by the business professional at the workstation. This data may also be received via imported data from other GRMS installations.

—Data Flow: Obj Inst Data 1118

Any object data required to support rule execution, behavior rule monitoring, exposure and risk calculations, reporting and query.

—Data Flow: Req Exp & Risk Data 1120

Secondary node initiated request describing exposure and risk detail requirements.

—Data Flow: Req Exp, Risk, Rule, Obj Data 1122

An information request from the Secondary Node to the Primary Node for exposure, risk, rule, and object data.

—Data Flow: Req Obj Data 1124

Requests describing the requirements for instances of data stored within the CMIS database.

—Data Flow: Req Rule Data 1126

Workstation generated request describing the requirement for rule data.

—Data Flow: Sel Exp Dtl 1128

Selected exposure details required by Proc Risk Data, Exposure reporting and query, Exposure Export and Exposure history rules.

—Data Flow: Sel Exp, Risk & Obj Data 1130

Selected exposure, risk and object data to support secondary node initiated ad hoc report, queries and analysis of exposure and risk data.

—Data Flow: Sel Exp. Risk, Rule, Obj Data 1132

Selected exposure, risk, rule and object data.

—Data Flow: Sel Obj Data 1134

Selected exposure, risk and reference data from various object related tables.

—Data Flow: Sel Risk Dtl 1136

Selected risk details describing instances of probable loss calculations.

—Data Flow: Sel Rule 1138

Selected rules requested by the workstation.

Figure 12:
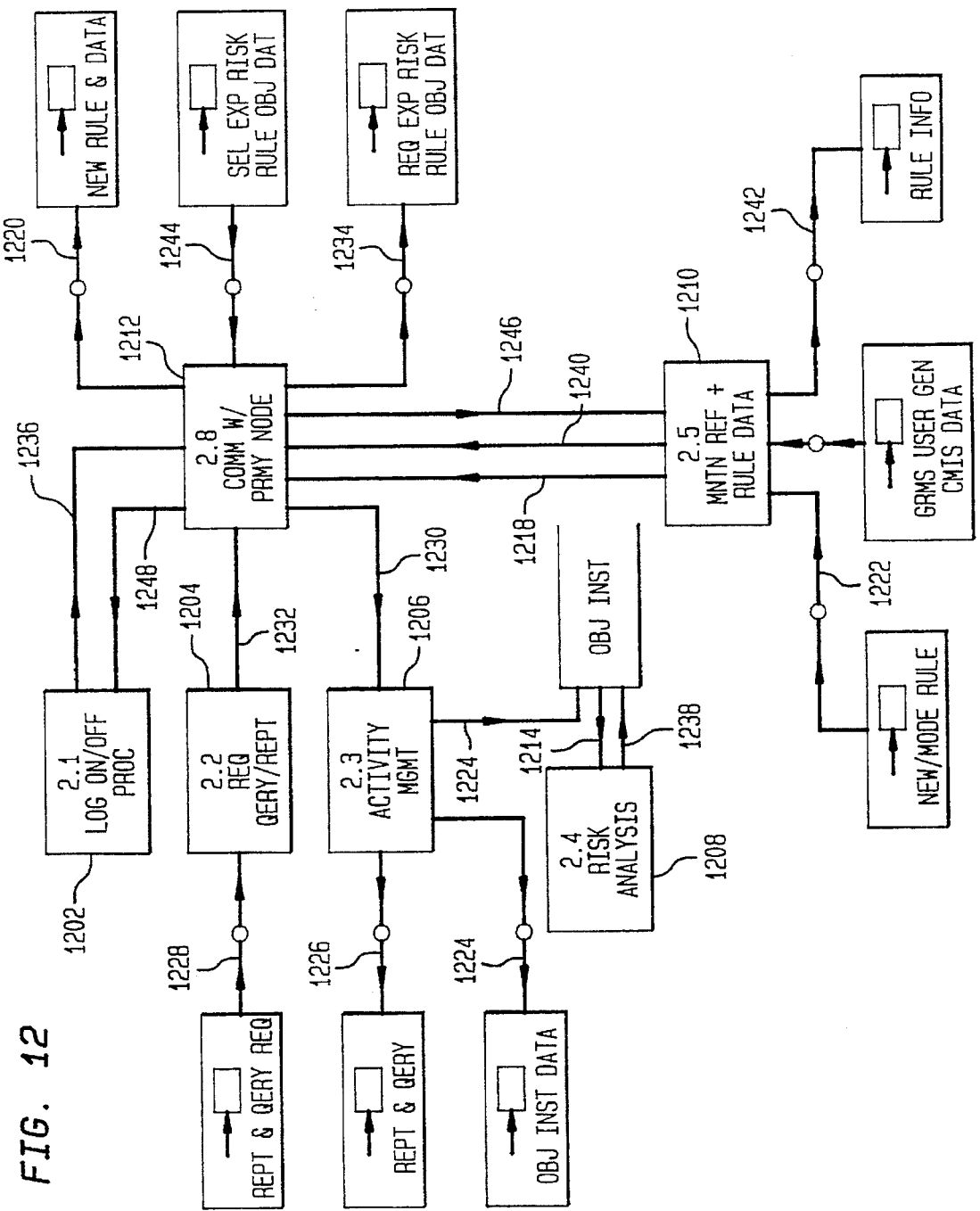

The following is a description of the process diagram in FIG. 12.

—Process: 2.1 Log On/Off Proc 1202

Process which allows the business user to logon or logoff of the GRMS system. For logon, the security tables on the primary node are examined to provide the proper security options for the user and the user is to set to a "logged on" state. For logoff, the use is set to a "logged off" state.

—Process: 2.2 Req Qery/Rept 1204

This process allows users to submit queries and reports to the primary node for processing the results are routed to the user through the Activity Management Process.

—Process: 2.3 Activity Mgmt 1206

This process receives the results of queries/reports from the primary node, presents them to users, and stores the object instance data to the local database for Risk Analysis. Other activities can also be received from the host, including messages from other users, and messages from behavior rule (e.g., limit) processing.

—Process: 2.4 Risk Analysis 1208

Risk analysis allows business users to execute queries/reports against instance data received from the primary node after a query/report execution. The user can change object instance values to perform "what if" analysis.

—Process: 2.5 Mntn Ref & Rule Data 1210

This process allows business users to add or modify GRMS reference data (e.g., system parameters, codes, security tables) as well as add or modify rules (e.g., object access routines).

—Process: 2.6 Comm w/Prmy Node 1212

This process represents a set of common routines that other secondary node processes use to communication with the primary node.

—Data Store: Obj Inst 1214

The Object Instance entity on the primary node stores all the values retrieved and calculated during the execution of queries/reports. These values are sent, through activity management, to the secondary nodes where the queries/reports were requested, and stored in this entity. Users can use these object instance values in performing risk and other "what if" analysis by changing the object instance values and running local queries/reports.

—Data Flow: GRMS User Gen CMIS Data 1216

CMIS data entered by GRMS users to add, modify or delete user accessibly CMIS data (Includes GRM manually initiated events).

—Data Flow: New/Mod Ref/Rule Data 1218

New or modified data entered and tested by the business user. This may be reference data or rule data.

—Data Flow: New Rule & Obj Data 1220

Updated rule and object data sent to the Primary Node from the Secondary Node.

—Data Flow: New/Mod Rule 1222

Updated rule instances created an/or modified and tested by the business professional at the workstation. This data may also be received via imported data from other FILMS installations.

—Data Flow: Obj Inst Data 1224

Any object data required to support rule execution, behavior rule monitoring, exposure and risk calculations, reporting and query.

—Data Flow: Rept & Query 1226

Formatted exposure and risk perspective reports and query responses to the user's request.

—Data Flow: Rept & Query Req 1228

A request to produce a report or display a query.

—Data Flow: Rept, Query, Obj Inst, Msg Data 1230

Data sent from the primary node to a secondary node including report output, object instance data for risk analysis, and message data from their users or from behavior rule (limit) processing.

—Data Flow: Req Exp or Risk Query/Rpt 1232

Request to primary node to execute a query/report.

—Data Flow: Req Exp, Risk, Rule, Obj Data 1234

An information request from the Secondary Note to the Primary Node for exposure, risk, rule and object data.

—Data Flow: Req Log On/Off 1236

Request to logon or logoff of GRMS.

—Data Flow: Req Obj Inst Data 1238

Request for object values form the object instance datastore.

—Data Flow: Req Ref/Rule Data 1240

Request to primary node for current reference or rule data.

—Data Flow: Rule Info 1242

GRMS user generated rules to determine and report Exposure and Risk Measurement and Behavior Rule Monitoring. These rules include how to report, calculate, store historical data and select object data.

—Data Flow: Sel Exp, Risk, Rule, Obj Data 1244
Selected exposure, risk, rule and object data.
—Data Flow: Sel Ref/Rule Data 1246
Reference or rule data selected from the primary node and sent to the secondary node.
—Data Flow: User Sec Info 1248
User security info sent to the secondary node based on a logon request.

Data Model Specifications

The Global Risk Management System (GRMS) logical data model is built upon the existing Corporate Management Information Model (CMIM) logical data model. This section contains a description of GRMS required entities and their relationships to CMIM. It does not attempt to reproduce the content of CMIM nor specify those portions of the CMIM model that the GRMS application will use for simple data access. Only CMIM entities that relate to GRMS entities area shown and discussed. This section specifies two Entity Relationship Diagram (ERD) subject areas (i.e., broad topics or groups of data entities) and object descriptions representing GRMS logical data model. These subject areas illustrate the integrated view of GRMS within the CMIM domain. The GRMS subject areas show only those CMIM entities for which GRMS has write access and those that are required by the key structure of GRMS entities.

GRMS Data Classes Subject Area

The GRMS Data Classes subject areas represent Exposure, Risk, GRMS Factors, Object Instance data and their relationships to those CMIM entities whose IDs are used within the keys. GRMS Data Classes contain the data created and used by the GRMS unique risk factors (e.g., credit risk factors) and specific instances of data to be analyzed within GRMS. The subject area contains the following entities:

| Data Class Entities | |
|---|---|
| Entity | System |
| System Parameter | GRMS |
| Code | GRMS |
| Business Calendar | GRMS |
| Security Group | GRMS |
| Security Authorization | GRMS |
| Perspective | GRMS |
| User Defined Facility | GRMS |
| Exposure DB | GRMS |
| Risk DB | GRMS |
| Object Instance | GRMS |
| GRMS Factor | GRMS |
| EMPLOYEE | CMIS |
| MANAGEMENT UNIT | CMIS |
| PRODUCT | CMIS |
| MARKET SEGMENT | CMIS |
| GEOGRAPHIC REGION | CMIS |
| MKT SEG CUSTOMER | CMIS |
| LEGAL PARTICIPANT | CMIS |
| CUSTOMER | CMIS |
| CUSTOMER ACCOUNT | CMIS |
| CUST ACCT PORT | CMIS |
| PORTFOLIO | CMIS |
| FIRM ACCOUNT | CMIS |
| ACCOUNT CATALOG | CMIS |

The System Parameter, Code, Business Calendar, Security Authorization entities area used to establish system parameters, look up tables, calendars, and to control application access. The Perspective and User Defined Facility entities are created by the GRMS user to define the 'scenario' used to calculate risk and view the results by a facility other than those defined within CMIM. The Exposure DB, Risk DB, Object Instance and GRMS Factor contain the core data of the GRMS application data. Each of these entities is keyed by the ID of CMIM entities together with risk types and timestamp information. This key structure provides the GRMS application with historic data describing the institution's exposure and risk together with the factors and specific object data used to calculate that information. The remaining entities are used within the CMIM product to describe the institution's organization, customers, portfolio and etc.

GRMS Object Data

The GRMS Object Data subject area contains entities to store rules for GRMS. As discussed previously, rules are stored as "objects" within the Object entity and are related to executable modules (programs). These rules are used in different contexts within the GRMS system.

The GRMS system is designed to respond to messages. Messages may come through CMIS (external system feeds, market data feeds), from users (queries and reports), or from scheduled events in the Event Calendar (automatic reports, behavior rules, historical risk calculations). Whatever the source of the message, these messages are stored in the GRMS Queue entity. The Message Routing Rule is used to help identify, based on the message id, how to construct the key into the Message To Object entity. Based on the Message ID and constructed key, the Message to Object entity is examined to find an Object. This Object is related to a Module through the Object To Module entity. This Module is then executed.

Exposure calculations are triggered by messages from operational systems and user requested events. The message is stored in the GRMS Queue. Based on the life cycle states defined in the Message to Object entity, and Object is found, which is related to a Module (through the Object To Module entity). This Module is executed to respond to this message.

Processing for risk works in much the same way as for exposure. Risk messages are usually triggered via report requests or to store historical probable loss values.

Processing for updating factors is very similar to exposure and risk processing. Although some GRMS Factors are updated manually, some are updated directly or indirectly via market data feeds.

Processing for queries and reports are triggered by an Event calendar message or a request from a business user. The message is stored in the GRMS Queue which is related to a Module (through the Object To Module entity). When executed, this Module will aggregate the appropriate exposure or probable loss and return it to the limit processor. If this limit has been exceeded, a message will be sent to a set of Employees indicating that a behavior rule has been violated.

During the execution of any of the modules (exposure calculation, risk calculation, query/report, etc.), data values will be needed. Example data values are Product Name, Loan Balance, and customer Payment Likelihood. These data values may be in CMIS/GRMS tables, in operational system tables, or require a simple or complex calculation. If each module that required an Object (like Product Name) had the logic to retrieve that value, there would be a large amount of redundant code in the system. Therefore, the logic for accessing each piece of data is isolated in a Module. This may be a few lines of SQL, or a long complex formula.

When a process needs some information, it finds the object name in the Object entity. This is related to the Object to Module entity. This contains an access type, which can be Create (to add a record to a table), Read (to read a table value), Update (to change a table value), or Delete (to delete a record). For calculation objects, the only valid access type, a Module is found to execute. It will return the value requested.

Whenever an object routine is executed, it places the returned value in the Object Instance entity. After executing a query/report, all the Object Instance values resulting from that query/report can be downloaded to the workstation for analysis. This analysis allows the query/report can be re-run on the workstation, whose object routines will find their values in the Object Instance entity. By changing these values and re-running queries/reports, the business professional can perform "what if" analysis.

Processing which displays information on the screen or on reports will require some formatting information about objects. The Data Object Definition entity provides this information.

Certain types of modules can be created and maintained by business professionals through a menu driven interface on the workstation. The information stored by this routine is used to generate the source code for the module. In order to change the module later, the information collected by the menu driven interface must be stored on the primary node and downloaded to the workstation as needed. This information is kept in the Module Definition entity.

Perspectives provide a way for the business professionals to change their view of risk. This view is based on different risk environments which include risk factors (GRMS Factors entity), different exposure an probable loss calculations, and are stored as different risk values (Risk DB). The Perspective entity stores the names of all the environments. It relates to Processes, which represent any processes that the user defines within the environment. These Processes will be stored as Objects and be related to incoming Message IDs in the Message to Object entity.

Entity Relationship Diagrams

It is the goals in developing the logical model to identify all the various pieces of information (attributes) that must be stored, and group them (into entities), so that data is represented in a logical nd non-redundant form.

It is not the goals of a logical database model to identify physical tables and fields. Often, however, the physical and logical models are quite similar. In the physical data design, efficiency is a major concern. A small amount of redundancy may be acceptable to achieve significant efficiency gains.

An entity is defined by its attributes and relationships. An attribute is a piece of information, like a Customer Name within a Customer entity. A relationship defines a sharing of attributes. More specifically, it means that the "key" attribute (s) from one entity become part of the other entity. For example, an entity that represents Loans would have a relationship from the Customer entity. This means that the key to the Customer entity (like Customer ID) would be part of the Loan entity. An important part of defining a relationship is to define how many related "occurrences" there can be. For example, for each Customer (the Customer entity), there can be zero to many Loans In the Loan entity). For each Loan, there can be one and only one Customer.

Entity relationship diagrams (ERDs) (FIGS. 13 and 14) are used to define the logical data model. They are made up of two components, entities and relationships. Entities are drawn as rectangles (for example, 1402 in FIG. 14), and relationships as lines (for example, 1450 in FIG. 14) connecting the entities. Relationships have symbols at each end called cardinalities (for example, 1452 in FIG. 14). The cardinalities are used to convey information about related occurrences. The following example illustrates how relationships and cardinalities are used:

The text on top of the relationship line describes the type of relationship between Entity A and Entity B. The line on the bottom describes the relationship between Entity B and Entity A. These two relationships are stated as follows:

Entity A Identifies Entity B

Entity B Is Identified By Entity A

The cardinalities define how many occurrences there can be. There are always two cardinality symbols near each entity, the one closest to the entity represents the maximum number of occurrences, the one a little farther away represents the minimum number of occurrences. A short line perpendicular to the relationship line means "one", a round circle means "zero", and a triangle means "many". Using these cardinalities, the relationships in the example above can be expanded as follows:

Entity A Identifies zero to many Entity B's

—or—

Entity A optionally identifies many Entity B's

Entity B Identified By one and only one Entity A

A relationship implies that the key from one entity is used within the other table. In this example, Entity B will contain the key to Entity A. The fact that we used the words "identifies/is identified by" implies that Entity B would use the Entity A key within its own key. Other relationships names such as "contains/is contained in", "describes/is described by", etc. can be used to define the context of the relationship and give some insight into how the entities relate.

Certain key data entities shown in 14 are described below.

The following is a description of Entity Type: Data Obj Def 1402:

For each data object in the object entity, a record exists in this entity to define length, type, and display characteristics.

|  | Attribute Types: |  |  |
|---|---|---|---|
| key- | ID |  | Req |
|  | Object.Object ID * |  | Req |
|  | Data Obj Format | (SHORTID) | Req |
|  | Data Obj Type |  | Req |
|  | Data Obj Length |  | Req |
|  | Data Obj Significance | (SMALLINT) | Opt |
|  | Relationship Types |  |  |
|  | Describes.Object * |  | 1-1 0-1 |

—Attribute Type: Data Obj Def.Data Obj Format

Format of data when displayed or used on a report.

—Attribute Type: Data Obj Def.Data Obj Length

For data with format of character, the length of the character data. For numbers, the length of the number before the decimal.

—Attribute Type: Data Obj Def.Data Obj Significance

Not used for character data. For numeric data, the number of significant digits stored to the right of the decimal.

—Attribute Type: Data Obj Def.Data Obj Type

Type of data, either character or data.

—Attribute Type: Data Obj Def.ID

Foreign key for object.

—Relationship Type: Object.Described By.Data Obj Def

For every data object in the Object entity, a record in the Data Object entity provides the type, format, and length of the data value.

The following is a description of Entity Type: Module 1404:

This entity contains the names of modules associated with objects through the object to module entity. Modules are executed to process messages, perform data access and aggregation (I/O), and perform calculations.

| | Attribute Types: | | |
|---|---|---|---|
| key- | Module ID | (SHORTID) | Req |
| | Module Type | (SHORTID) | Req |
| | Source Code Module | (SHORTTEXT) | Opt |
| | Relationship Types | | |
| | Defined By.Module Def | | 0-M 1-1 |
| | Identified By.Obj to Mod | | 0-M 1-1 |

—Attribute Type: Module.Module ID

The name of the module as known by the operating system.

—Attribute Type: Module.Module Type

Type of module—either link or load module.

—Attribute Type: Module.Source Code Module

Defines the name of the source code module as it is known by the operating system. Null if the source code is not provided.

—Relationship Type: Module.Defined By.Module Def

This relationship ties a set of program generation rules with a module. The program generation rules are developed in the definition environment and are used to "generate" the related module. These rules are downloaded and used by the workstation when a module needs to be modified.

—Relationship Type: Obj to Mod.Identifies.Module

This relationship represents the module portion of the object to module entity. An object can relate to several modules based on the type of access. The same module can be executed by different object/access combinations. Modules are not necessarily referenced in the object to module entity if they are not currently being used.

The following is a description of Entity Type: Module Def 1406:

This entity stores the sets of rules for generating modules. These sets of rules are created by the menu driven process on the workstation.

| | Attribute Types: | | |
|---|---|---|---|
| key- | ID | | Req |
| | Module.Module ID* | | Req |
| | Seq Num | (SMALLINT) | Req |
| | Rule | (DESCRIPTION) | Req |
| | Relationship Types | | |
| | Defines.Module * | | 1-1 0-M |

—Attribute Type: Module Def.ID

Concatenation of fields to make a unique key.

—Attribute Type: Module Def.Rule

An unformatted string which is a rule for generating a module. The rule is parsed by the code generation logic.

—Attribute Type: Module Def.Seq Num

Absolute sequence number for this rule within a set of rules to define a module.

—Relationship Type: Module.Defined By.Module Def

This relationship ties a set of program generation rules with a module. The program generation rules are developed in the definition environment and are used to "generate" the related module. These rules are downloaded and used by the workstation when a module needs to be modified.

The following is a description of Entity Type: Instance 1408:

This entity stores object values that were obtained or written during the execution of a process (in response to a message). If the process was a report or query, these values can be downloaded to the requesting workstation for "what if" analysis. This entity may be used as a temporary holding area for all objects and used to speed access (i.e., act as a cache) for frequently requested objects. Only values for data and calculation objects are stored, process objects do not return values. After the transaction has completed (including the download to the workstation), the values in this table for that transaction number are deleted.

| | Attribute Types: | | |
|---|---|---|---|
| key- | ID | | Req |
| | Tran Num | (LONGINT) | Req |
| | Obj to Mod.Object ID *1 | | Req |
| | PRODUCT.key *2 | | Opt |
| | MANAGEMENT UNIT.key *3 | | Opt |
| | MARKET SEGMENT.key *4 | | Opt |
| | GEOGRAPHIC REGION.key *5 | | Opt |
| | LEGAL PARTICIPANT.key *6 | | Opt |
| | CUSTOMER ACCOUNT.key *7 | | Opt |
| | CUSTOMER.key *8 | | Opt |
| | PORTFOLIO.key *9 | | Opt |
| | FIRM ACCOUNT.key *10 | | Opt |
| | USER DEFINED FACILITY.key *11 | | Opt |
| | Instance Context | (DESCRIPTION) | Opt |
| | Instance Value | (LONGDESC) | Req |
| | Relationship Types | | |
| | Generated By.Obj to Mod *1 | | 1-1 0-M |
| | Identified By.PRODUCT *2 | | 0-1 0-M |
| | Identified By.MANAGEMENT UNIT *3 | | 0-1 0-M |
| | Identified By.MARKET SEGMENT *4 | | 0-1 0-M |
| | Identified By.GEOGRAPHIC REGION *5 | | 0-1 0-M |
| | Identified By.LEGAL PARTICIPANT *6 | | 0-1 0-M |
| | Identified By.CUSTOMER ACCOUNT *7 | | 0-1 0-M |
| | Identified By.CUSTOMER *8 | | 0-1 0-M |
| | Identified By.PORTFOLIO *9 | | 0-1 0-M |
| | Identified By.FIRM ACCOUNT *10 | | 0-1 0-M |
| | Identified By.USER DEFINED FACILITY *11 | | 0-1 0-M |

—Attribute Type: Obj Instance.ID

Concatenation of fields to make a unique key.

—Attribute Type: Obj Instance.Instance Context

This is a set of object specific information which makes this instance of an object different from other instances. If this object instance is uniquely identified by the 10 part CMIM key, this field will be null.

—Attribute Type: Obj Instance.Instance Value

The value of this object instance. This will be a number for calculations and numeric lookups, or a character string for text lookups.

—Attribute Type: Obj Instance.Tran Num

Unique identifier for a GRMS transaction. A single GRMS transaction can generate many object instances. See GRMS Queue entity.

—Relationship Type: Obj Instance.Generated By.Obj to Mod

This relates an object and access type with the value in the object instance entity.

—Relationship Type: PRODUCT.Identifies.Obj Instance

Relates object instances to PRODUCT portion of CMIM key.

—Relationship Type: MANAGEMENT UNIT.Identifies.Obj Instance

Relates object instances to MANAGEMENT UNIT portion of CMIM key.

—Relationship Type: MARKET SEGMENT.Identifies.Obj Instance

Relates object instances to MARKET SEGMENT portion of CMIM key.

—Relationship Type: LEGAL PARTICIPANT.Identifies.Obj Instance

Relates object instances to LEGAL PARTICIPANT portion of CMIM key.

—Relationship Type: CUSTOMER.Identifies.Obj Instance

Relates object instance to CUSTOMER portion of CMIM key.

—Relationship Type: CUSTOMER ACCOUNT.Identifies.Obj Instance

Relates object instances to CUSTOMER ACCOUNT portion of CMIM key.

—Relationship Type: PORTFOLIO.Identifies.Obj Instance

Relates object instances to PORTFOLIO portion of CMIM key.

—Relationship Type: USER DEFINED FACILITY.Identifies.Obj Instance

Relates object instances to USER DEFINED portion of CMIM key.

—Relationship Type: FIRM ACCOUNT.Identifies.Obj Instance

Relates object instances with the FIRM ACCOUNT portion of the CMIM key.

—Relationship Type: GEOGRAPHIC REGION.Identifies.Obj Instance

Relates object instances to the GEOGRAPHIC REGION portion of the CMIM key.

The following is a description of Entity Type: Obj to Mod 1410:

This entity relates objects to modules. Different objects are used in different situations. Process objects are used when processing a message. Data objects are used to access data values throughout the system. Calculation objects compute values using data objects. Limit objects are used to aggregate data for limit processing. The distinction between calculation and data objects is important when defining objects, but is not important when using them. For example, a process object that needs a risk factor doesn't care whether it is a calculated value, or is stored in a database table. It simply requests that the object read the value.

The following table summarizes the types of objects and their usage.

| It relates . . . | To modules which are dynamically executed . . . |
|---|---|
| Process objects | in response to messages. Process objects use data objects and calculation objects to perform data access and computations. (Examples: Exposure and risk processes, report and query processes). |
| Data objects and access types (create, read, update, delete) | during the execution of other objects or by the base application. These objects can access data anywhere on the institution's system (CMIS, GRMS, or other systems/databases). Examples: Exposure Value/read, Risk/create, Product Name/read, Factor/create, Code/delete, Sys Parm/read.) |
| Calculation objects | during the execution of other objects or by the base application. The access type for calculation objects is always "read." (Examples: Black Shoals calculation, exposure and risk calculations, multiply risk times risk factor.) |
| Limit objects | during the execution of behavior rules processing. These objects will aggregate data in the risk and exposure entities for comparison with limit values. The access type for limit objects is always "read." (Examples: Aggregate exposure for Tokyo management unit, Aggregate risk for all loans.) |

| | Attribute Types: | | |
|---|---|---|---|
| key- | ID | | Req |
| | Object.Object ID * | | Req |
| | Access Type | (SHORTID) | Req |
| | Relationship Types | | |
| | Identified By.Object * | | 1-1 0-M |
| | Generates.Obj Instance | | 0-M 1-1 |
| | Identifies.Module * | | 1-1 0-M |

—Attribute Type: Obj to Mod.Access Type

For data objects, this field identifies the type of access (create, read, update, or delete) that is supplied by the module. For other objects, this field is set to executable.

—Attribute Type: Obj to Mod.ID

Concatenation of fields to make a unique key.

—Relationship Type: Obj Instance. Generated By.Obj to Mod

This relates an object and access type with the value in the object instance entity.

—Relationship Type: Object.Identifies.Obj to Mod

This relationship represents the object portion of the object to module entity. A particular object can be related to several modules based on the type of access required (create, read, update, delete, or execute).

—Relationship Type: Obj to Mod.Identifies.Module

This relationship represents the module portion of the object to module entity. An object can relate to several modules based on the type of access. The same module can be executed by different object/access combinations. Modules are not necessarily referenced in the object to module entity if they are not currently being used.

The following is a description of Entity Type: Object 1412:

This entity provides a definition of and linkage to data rules concerning objects. Objects include data elements (e.g., exposure, risk, risk factors, CMIM data), and processes (e.g., report, query, exposure calculation, risk calculation, rules). Since objects can exist to access any data within the system (CMIS, GRMS, institution systems, etc.) there are implied relationships between object and every data table in the system. These relationships are not shown to simplify the diagrams.

| Attribute Types: | | |
|---|---|---|
| key- ID | | Req |
| Object Type | (SHORTID) | Req |
| Object ID | (SHORTID) | Req |
| Object Name | (LONGTEXT) | Req |
| Object Description | (DESCRIPTION) | Opt |
| Relationship Types | | |
| Identified By.Look Up Rule | | 0-M 1-1 |
| Described By.Data Obj Def | | 0-M 1-1 |
| Identified By.Process | | 0-M 1-1 |
| Identifies.Obj to Mod | | 0-M 1-1 |
| Restricted By.LIMIT | | 0-M 1-1 |

—Attribute Type: Object.ID

Concatenation of fields to make a unique key.

—Attribute Type: Object.Object Description

Detailed description of the object.

—Attribute Type: Objects.Object ID

The ID by which an object is known. Objects can represent data elements, I/O rules, calculation rules, and processes.

—Attribute Type: Object.Object Name

The name of the object. All object names are stored in this centralized entity.

—Attribute Type: Object.Object Type

Type of object—data, calculation object, limit object, or process object.

—Relationship Type: Object, Described By.Data Obj Def

For every data object in the Object entity, a record in the Data Object entity provides the type, format, and length of the data value.

—Relationship Type: Object.Identifies.Obj to Mod

This relationship represents the object portion of the object to module entity. A particular object can be related to several modules based on the type of access required (create, read, update, delete, or execute).

—Relationship Type: Msg to Obj.Identifies.Object

This relationship identifies the object found by performing a look up in the Look Up Rule entity. The object is associated with a Module through the Object to Module entity.

—Relationship Type: Process.Identifies.Object

This relates a Process to an Object—which is subsequently linked, through the Object To Module entity, to a Module.

—Relationship Type: LIMIT.Restricts.Object

Limits can be imposed at any level of aggregation of exposure or risk. Therefore, limits are not placed directly on exposure or risk, but on an object which will aggregate the amount to the appropriate level. The limit amount is then compared with the value returned by the object.

The following is a description of Entity Type: RISK DB 1414:

The RISK entity defines the type and level of qualified exposure associated with different products. Examples of types of risk are foreign exchange and credit risk.

The level of aggregation is determined by null values in any of the key values. However, PRODUCT.ID may not be null. This entity represents both current and historic data through the TIMESTAMP attribute of each record.

| Attribute Types: | | |
|---|---|---|
| key- ID | | Req |
| RISK TYPE | (LONGINT) | |
| PERSPECTIVE.ID *1 | | |
| MANAGEMENT UNIT.ID *3 | | |
| GEOGRAPHIC REGION.ID *4 | | |
| LEGAL PARTICIPANT.ID *5 | | |
| CUSTOMER.ID *6 | | |
| CUSTOMER ACCOUNT.ID *7 | | |
| FIRM ACCOUNT.ID *8 | | |
| PORTFOLIO.ID *9 | | |
| MARKET SEGMENT.ID *10 | | |
| USER DEFINED FACILITY.ID *11 | | |
| TIMESTAMP | (TIMESTAMP) | Req |
| RISK VALUE | (AMOUNT) | Req |
| UNIT CURR | (LONGTEXT) | Req |
| Relationship Types | | |
| Generated By.Perspective *1 | | 0-1 0-M |
| Identified By.PRODUCT *2 | | 1-1 0-M |
| Identified By.MANAGEMENT UNIT *3 | | 0-1 0-M |
| Identified By.GEOGRAPHIC REGION *4 | | 0-1 0-M |
| Identified By.LEGAL PARTICIPANT *5 | | 0-1 0-M |
| Identified By.CUSTOMER *6 | | 0-1 0-M |
| Identified By.CUSTOMER ACCOUNT *7 | | 0-1 0-M |
| Identified By.FIRM ACCOUNT *8 | | 0-1 0-M |
| Identified By.PORTFOLIO *9 | | 0-1 0-M |
| Identified By.MARKET SEGMENT *10 | | 0-1 0-M |
| Identified By.USER DEFINED FACILITY *11 | | 0-1 0-M |

—Attribute Type: RISK DB.CURRENCY

The currency unit of the probable loss amount using the three character currency swift code (e.g., USD, GDM, YEN).

—Attribute Type: RISK DB.ID

The unique identifier of RISK DB records formed as a concatenation of views (e.g., RISK PERSPECTIVE, PRODUCT), RISK TYPE and TIMESTAMP.

—Attribute Type: RISK DB.RISK TYPE

Specification of either credit or foreign exchange risk type.

—Attribute Type: RISK DB.RISK VALUE

The amount of risk (i.e., Probable Loss, Correlated Product Exposure).

—Attribute Type: RISK DB.TIMESTAMP

Date and time that this risk record was created.

—Relationship Type: Perspective. Describes. RISK DB

Each perspective optionally describes many RISK DB records. The values will be stored over time in the RISK DB entity. This relationship makes the results of the risk calculations, made within a risk perspective, part of the perspective.

—Relationship Type: PRODUCT.Identifies.RISK DB

Each PRODUCT optionally identifies many RISK DB records. This relationship allows each PRODUCT to be evaluated by many RISK DB records (e.g., Probable Loss and Correlated Product Exposure by PRODUCT).

—Relationship Type: MANAGEMENT UNIT.Identifies.RISK DB

This relationship allows each MANAGEMENT UNIT to optionally identify many RISK DB records.

—Relationship Type: GEOGRAPHIC REGION.Identifies.RISK DB

This relationship allows each GEOGRAPHIC REGION to optionally identify many RISK DB records.

—Relationship Type: LEGAL PARTICIPANT.Identifies.RISK DB

This relationship allows each LEGAL PARTICIPANT to optionally identify many RISK DB records.

—Relationship Type: CUSTOMER ACCOUNT.Identifies.RISK DB

Each CUSTOMER ACCOUNT optionally identifies RISK DB records. This relationship allows each CUSTOMER ACCOUNT to be evaluated by many RISK DB record (e.g., Probable Loss and Correlated Product Exposure by CUSTOMER ACCOUNT).

—Relationship Type: PORTFOLIO.Identifies.RISK DB

Each PORTFOLIO optionally identifies many RISK DB records. This relationship allows each PORTFOLIO to be associated with many RISK DB records.

—Relationship Type: MARKET SEGMENT.Identifies.RISK DB

Each MARKET SEGMENT optionally identifies many RISK DB records. This relationship allows each MARKET SEGMENT to be associated with many RISK DB records.

—Relationship Type: CUSTOMER.Identifies.RISK DB

Each CUSTOMER optionally identifies many RISK DB records. This relationship allows each CUSTOMER to be associated with many RISK DB records (e.g., Probable Loss and Correlated Product Exposure by CUSTOMER).

—Relationship Type: FIRM ACCOUNT.Identifies.RISK DB

Each FIRM ACCOUNT optionally identifies many RISK DB records. This relationship allows each FIRM ACCOUNT to be evaluated by many RISK DB records (e.g., Probable Loss and Correlated Product Exposure by FIRM ACCOUNT).

—Relationship Type: RISK DB.Is Identified by.USER DEFINED FACILITY

This relationship allows each USER DEFINED FACILITY to optionally identify many RISK DB records.

While the invention has been particularly shown and described with reference to a preferred embodiment thereof, it will be understood by those skilled in the art that various changes in form and details may be made therein without departing from the spirit and scope of the invention.

Having thus described our invention, what we claim as new and desire to secure by Letters Patent is:

1. A computer program product for use with a relational database for storing rules and data and for use with a display, said computer program product comprising:
   a computer usable medium having a computer readable program code means embodied in said medium for enabling a computer to perform risk and exposure calculations in accordance with rules stored as objects in the relational database, said computer readable program code means comprising:
   computer readable first program code means for enabling said computer to display rules to perform risk and exposure calculations in a presentation format on the display and for allowing a user to modify existing rules in a presentation format and create new rules in a presentation format using arithmetic and logical expressions;
   computer readable second program code means to enable said computer to translate rules in a presentation format to rules in a table format, and for storing said rules in a table format as objects in the relational database; and
   computer readable third program code means for enabling said computer to retrieve said rules in a table format stored as objects in the relational database and to perform calculations according to said rules in a table format using said stored data, said computer readable third program code means including,
   computer readable fourth program code means for enabling said computer to respond to external and internal events, and
   computer readable fifth program code means for enabling said computer to retrieve said stored rules and data with predetermined keys.

2. The computer program product of claim 1, wherein said rules in a presentation format include variables and said computer readable second program code means further includes means for decomposing each variable in said rules in a presentation format into one of a previously translated rule in a table format, a program for retrieving a primitive data value, and a program for calculating a value.

3. The computer program product of claim 2, wherein said computer readable third program code means further includes means for retrieving preselected ones of said rules in said table format for the relational database and performing a calculation defined by said preselected ones of said rules in said table format.

4. The computer program product of claim 3, further including what-if means for storing primitive data values retrieving a primitive data value, for allowing a user to manipulate said primitive data values re-perform calculations according to said rules in said table format using said manipulated primitive data values.

5. The computer program product of claim 3, wherein said rules stored as tables in the relational database can be retrieved as objects.

6. A computer program product for use with a relational database for storing rules, said computer program product comprising:
   a computer usable medium having a computer readable program code means embodied in said medium for enabling a computer to perform calculations in accordance with rules stored as objects in the relational database, said computer readable program code means comprising:
   computer readable first program code means for causing said computer to input one of a mathematical and a logical rule which defines a calculation, said rule including variables;
   computer readable second program code means for causing said computer to convert said rule into a table which also defines said calculation;
   computer readable third program code means for causing said computer to store said table as an object in the relational database; and
   an application program for retrieving said table from the relational database; and performing said calculations defined in said table using said stored data, said application program including,
   an event processing program responsive to external and internal events, and
   an interfacing program having predetermined keys for retrieving said stored rules and data.

7. The computer program product of claim 6, wherein said computer readable first program code means includes interactive means for allowing a user to create new rules and modify exiting rules.

8. The computer program product of claim 7, wherein including a program for retrieving said table from the relational database and performing said calculation defined by said table.

9. The computer program product of claim 8, wherein said computer readable second program code means further includes means for decomposing said variables in said rule into a previously converted rule, one of a plurality of programs for retrieving a primitive data value, and one of a plurality of programs for calculating a value.

10. The computer program product of claim 9, further including what-if means for storing said primitive data values retrieved by said programs for retrieving a primitive data value and for allowing a user to manipulate said primitive data values and re-perform said calculation according to said table using said manipulated primitive data values.

11. A program storage device readable by a computer system, tangibly embodying a program of instructions executable by said computer system to perform method steps for enabling said computer system to respond to external and internal events, to store rules as objects in an object based computer database, to retrieve and execute the stored rules, and retrieve stored data to calculate risk and exposure variables, said method steps comprising:

(1) inputting a risk and exposure rule having variables, said rule defines a logical or a mathematical calculation;

(2) converting said inputted rule of step (1) into a table;

(3) storing said table of step (2) as an object in said database;

(4) retrieving said table of step (3) from the database;

(5) obtaining data values corresponding to each said variable of said rule in said table; and (6) performing said calculation defined by said rule of step (1).

12. The program storage device of claim 11, wherein step (2) further includes the step of:

(a) decomposing each variable within said rule into a program for retrieving a primitive data value or a program for calculating a value or a rule which had been previously converted into a table.

13. The program storage device of claim 12, further including the steps of:

(7) storing primitive data values retrieved by said programs for retrieving a primitive data value; and (8) allowing a user to manipulate said primitive data values and re-perform calculations according to said rule using said manipulated primitive data values.

14. The program storage device of claim 12, wherein step (1) further includes allowing a user to modify existing rules which are then treated as said inputted rule.

15. A program storage device readable by a computer system, tangibly embodying a program of instructions executable by said computer system to perform method steps for enabling said computer system, to store rules utilized by application programs, wherein the rules are stored as objects in a database, said method steps comprising:

(1) converting a rule in the form of a mathematical or a logical formula having variables to a table format, wherein each of said variables in said rule is decomposed into a rule previously converted into said table format, a program for retrieving a primitive data value for each said variable or a program for calculating a value for each said variable; and (2) storing said table as an object in said database.

16. The program storage device of claim 15, wherein step (1) is repeated for each of said variables which decomposes into a rule, until all rules have been decomposed into programs for retrieving primitive data values, programs for calculating a value, or a rule previously converted into said table format.

* * * * *